(12) United States Patent
Watanabe et al.

(10) Patent No.: US 7,877,184 B2
(45) Date of Patent: Jan. 25, 2011

(54) CONTROL APPARATUS AND CONTROL METHOD FOR HYBRID VEHICLE

(75) Inventors: Hideto Watanabe, Toyota (JP); Yasuo Shimizu, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 887 days.

(21) Appl. No.: 11/808,237

(22) Filed: Jun. 7, 2007

(65) Prior Publication Data

US 2008/0004780 A1  Jan. 3, 2008

(30) Foreign Application Priority Data

Jun. 28, 2006 (JP) .............................. 2006-178669

(51) Int. Cl.
*G06F 19/00* (2006.01)
(52) U.S. Cl. ...................... 701/54; 180/247; 180/65.28; 477/115; 903/906
(58) Field of Classification Search .................. 701/54; 180/247, 65.28, 65.7, 65.31; 477/115; 903/904, 903/906, 914
See application file for complete search history.

(56) References Cited

U.S. PATENT DOCUMENTS

| | | | | |
|---|---|---|---|---|
| 4,757,870 | A * | 7/1988 | Torii et al. ................... | 180/233 |
| 6,209,672 | B1 * | 4/2001 | Severinsky ................ | 180/65.23 |
| 6,247,437 | B1 * | 6/2001 | Yamaguchi et al. ....... | 123/179.3 |
| 7,104,347 | B2 * | 9/2006 | Severinsky et al. ........ | 180/65.23 |
| 7,219,497 | B2 * | 5/2007 | Kowatari et al. .............. | 60/608 |
| 7,237,634 | B2 * | 7/2007 | Severinsky et al. ........ | 180/65.23 |
| 7,455,134 | B2 * | 11/2008 | Severinsky et al. ........ | 180/65.28 |

(Continued)

FOREIGN PATENT DOCUMENTS

EP    903492 A2 *  3/1999

(Continued)

OTHER PUBLICATIONS

Front-and-rear-wheel-independent-drive type electric vehicle (FRID EV) with the outstanding driving performance suitable for next-generation adavanced EVs; Mutoh, N.; Takahashi, Y.; Vehicle Power and Propulsion Conference, 2009. VPPC '09. IEEE Digital Object Identifier: 10.1109A/PPC.2009.5289731; Publication Year: 2009 ,pp. 1064-1070.*

(Continued)

*Primary Examiner*—Cuong H Nguyen
(74) *Attorney, Agent, or Firm*—Oliff & Berridge, PLC

(57) ABSTRACT

A control apparatus for a hybrid vehicle includes a required torque calculating portion that calculates required drive torque required of the vehicle; a running mode switching portion that switches between a motor running mode and a hybrid running mode according to the calculated required drive torque; a torque distribution control portion that sets the torque distribution between front and rear wheels according to the switched running mode; a gear noise preventing portion that prevents gear noise in a gear mechanism by changing the set torque distribution between the front and rear wheels when a predetermined gear noise producing condition is satisfied; and a drive torque control portion that calculates drive torques of the front and rear wheels based on the calculated required drive torque and the changed torque distribution and controls the torques of the engine and the electric motor.

15 Claims, 12 Drawing Sheets

U.S. PATENT DOCUMENTS

| | | | |
|---|---|---|---|
| 7,520,353 B2 * | 4/2009 | Severinsky et al. | ....... 180/65.28 |
| 2003/0226702 A1 * | 12/2003 | Imai et al. | ................... 180/247 |
| 2008/0004780 A1 * | 1/2008 | Watanabe et al. | ............. 701/54 |

FOREIGN PATENT DOCUMENTS

| | | | |
|---|---|---|---|
| JP | A-03-261306 | | 11/1991 |
| JP | B2-2664674 | | 10/1997 |
| JP | 10-222344 | * | 7/1998 |
| JP | A-11-093725 | | 4/1999 |
| JP | A-11-173171 | | 6/1999 |
| JP | 2002-120774 | * | 4/2002 |
| JP | A-2004-254434 | | 9/2004 |
| JP | A-2005-151723 | | 6/2005 |
| JP | A 2005-161961 | | 6/2005 |
| JP | A-2006-044638 | | 2/2006 |
| JP | 2007210382 A | * | 8/2007 |
| JP | 2008222168 A | * | 9/2008 |
| WO | WO 0015455 A2 | * | 3/2000 |

OTHER PUBLICATIONS

Optimal Design and Control of a Wheel Motor for Electric Passenger Cars; Yang, Y.-P.; Chuang, D. S.; Magnetics, IEEE Transactions on; vol. 43, Issue: 1, Part: 1; Digital Object Identifier: 10.1109/TMAG. 2006.886153 Publication Year: 2007, pp. 51-61.*

The twin-axle and real-time parallel-series hybrid electric driving system; Yin Xu; Dong Chen; Mechanic Automation and Control Engineering (MACE), 2010 International Conference on; Digital Object Identifier: 10.1109/MACE.2010.5535289 Publication Year: 2010, pp. 5422-5425.*

Traction control of Hybrid Electric Vehicle; Li Shoubo; Liao Chenglin; Chen Shanglou; Wang Lifang; Vehicle Power and Propulsion Conference, 2009. VPPC '09. IEEE; Digital Object Identifier: 10.1109/VPPC.2009.5289563 Publication Year: 2009, pp. 1535-1540.*

Driving/regeneration and stability driver assist in 4WD hybrid vehicles; Naderi, P.; Bathaee, S.M.T.; Hoseinnezhad, R.; Power Engineering Conference, 2008. AUPEC '08. Australasian Universities; Publication Year: 2008, pp. 1-6.*

Vibration suppression of induction-motor-driven hybrid vehicle using wheel torque observer; Asano, K.; Okada, S.; Iwamam, N.; Industry Applications, IEEE Transactions on; vol. 28, Issue: 2; Digital Object Identifier: 10.1109/28.126754 Publication Year: 1992, pp. 441-447.*

Induction-motor-driven vehicle with vibration suppression using wheel torque observer; Asano, K.; Okada, S.; Iwama, N.; Electronic Applications in Transportation, 1990., IEEE Workshop on; Digital Object Identifier: 10.1109/EAIT.1990.205476 Publication Year: 1990, pp. 79-84.*

Traction control of Hybrid Electric Vehicle; Li Shoubo;et al.; Vehicle Power and Propulsion Conference, 2009. VPPC '09. IEEE Digital Object Identifier: 10.1109/VPPC.2009.5289563; Publication Year: 2009, pp. 1535-1540.*

Chinese Office Action issued in Chinese Patent Application No. 200710127548.2 on May 12, 2010 (with translation).

* cited by examiner

FIG. 4

| RUNNING MODE | ENGINE | MG1 | MG2 | MGR | REMARKS |
|---|---|---|---|---|---|
| MOTOR TWO-WHEEL | | | ○ | | LIGHT LOAD |
| HYBRID TWO-WHEEL | ○ | ● | ○ | | LIGHT LOAD (WHEN SOC IS LOW) / STEADY RUNNING |
| MOTOR FOUR-WHEEL | | | ○ | ○ | TAKEOFF FROM A STANDSTILL |
| HYBRID FOUR-WHEEL | ○ | ● | ○ | ○ | TAKEOFF FROM A STANDSTILL (WHEN SOC IS LOW) / ACCELERATING / LOW μ ROAD |
| DECELERATION BRAKING | | | ● | ● | DECELERATING |

CONTROL APPARATUS AND CONTROL METHOD FOR HYBRID VEHICLE

INCORPORATION BY REFERENCE

The disclosure of Japanese Patent Application No. 2006-178669 filed on Jun. 28, 2006, including the specification, drawings and abstract is incorporated herein by reference in its entirety.

BACKGROUND OF THE INVENTION

1. Field of the Invention

The invention relates to a control apparatus and a control method for a hybrid vehicle. More particularly, the invention relates to a control apparatus and a control method that prevents gear noise caused by torque fluctuation in the engine from being produced when the drive torque of the vehicle is relatively small.

2. Description of the Related Art

Japanese Patent Application Publication No. 2005-161961 describes a type of hybrid vehicle in which either the front wheels or the rear wheels are driven by power from a first drive portion having an engine, first and second electric motors, and a gear type power split device that divides the power from the engine between the first electric motor and an output shaft, while the other wheels are driven by power from a second drive portion made up of a third electric motor. This kind of hybrid vehicle can run in several running modes, including a "motor two-wheel running" mode in which the engine is stopped and either the front wheels or the rear wheels are driven by power generated from the second electric motor, a "hybrid two-wheel running" mode in which either the front wheels or the rear wheels are driven by both the engine and the second electric motor, a "motor four-wheel running" mode in which the engine is stopped and either the front wheels or the rear wheels are driven by power generated from the second electric motor (i.e., as in the "motor two-wheel running" mode) and the other wheels are driven by power from the third electric motor as necessary, and a "hybrid four-wheel running" mode in which either the front wheels or the rear wheels are driven by both the engine and the second electric motor (i.e., as in the "hybrid two-wheel running" mode) and the other wheels are driven by power from the third electric motor as necessary.

In order to switch between the motor running mode and the hybrid running mode when the vehicle is moving, it may be necessary to start and stop the engine while the vehicle is in motion. However, a relatively large amount of torque fluctuation is generated when starting or stopping the engine so when the torque from the first drive portion is small, it temporarily becomes equal to or less than zero by the torque fluctuation in the engine, and as a result, gear noise may be produced from backlash in the gears in the gear type power split device which may result in a loss of comfort.

Also, in this kind of hybrid vehicle, the engine is typically operated at optimum fuel efficiency and torque control of the second electric motor is performed according to the required torque. However, because torque fluctuation increases if the engine speed is low, when the required torque is low such that the torque from the second electric motor is near zero, the torque from the first drive portion may temporarily become equal to or less than zero from torque fluctuation in the engine even if the engine is running. As a result, the gear noise may be produced from backlash of the gears in the gear type power split device as described above.

SUMMARY OF THE INVENTION

The invention provides a control apparatus and a control method of a hybrid vehicle having a first drive portion that includes an engine, an electric motor, and a gear mechanism such as a power split device. In particular, the invention prevents gear noise in the gear mechanism due to torque fluctuation in the engine from being produced when the drive torque of the vehicle is relatively small.

A first aspect of the invention relates to a control apparatus for a hybrid vehicle, which includes a required drive torque calculating portion, a running mode switching portion, a torque distribution control portion, a drive torque control portion, and a gear noise preventing portion. The required drive torque calculating portion calculates required drive torque that is required of the vehicle. The running mode switching portion switches between running modes according to the calculated required drive torque, from among i) a "motor running" mode in which wheels are driven by power from an electric motor; and ii) a "hybrid running" mode in which the wheels are driven by operating both an engine and an electric motor. The torque distribution control portion sets torque distribution between front and rear wheels according to the switched running mode. The gear noise preventing portion prevents gear noise in a gear mechanism due to torque fluctuation in the engine by changing the set torque distribution between the front and rear wheels when a predetermined gear noise producing condition is satisfied. The drive torque control portion calculates drive torques of the front and rear wheels based on the calculated required drive torque and the changed torque distribution, and controls the drive torques of the engine and the electric motor.

A second aspect of the invention relates to a control method for a hybrid vehicle. This control method includes a) calculating required drive torque that is required of the vehicle; b) switching between running modes according to the calculated required drive torque, from among i) a "motor running" mode in which wheels are driven by power from an electric motor and ii) "a hybrid running" mode in which the wheels are driven by operating both an engine and an electric motor; c) setting torque distribution between front and rear wheels according to the switched running mode; d) changing the set torque distribution between the front and rear wheels when a predetermined gear noise producing condition is satisfied; and e) calculating drive torques of the front and rear wheels based on the calculated required drive torque and the changed torque distribution between the front and rear wheels and controlling the drive torques of the engine and the electric motor.

A third aspect of the invention relates to a control apparatus for a hybrid vehicle, which includes required drive torque calculating means, running mode switching means, torque distribution control means, drive torque control means, and gear noise preventing means. The required drive torque calculating means calculates required drive torque that is required of the vehicle. The running mode switching means switches between running modes according to the calculated required drive torque, from among i) a "motor running" mode in which wheels are driven by power from an electric motor; and ii) a "hybrid running" mode in which the wheels are driven by operating both an engine and an electric motor. The torque distribution control means sets torque distribution between front and rear wheels according to the switched running mode. The gear noise preventing means prevents gear noise in a gear mechanism due to torque fluctuation in the engine by changing the set torque distribution between the front and rear wheels when a predetermined gear noise producing condition is satisfied. The drive torque control means calculates drive torques of the front and rear wheels based on the calculated required drive torque and the changed torque distribution, and controls the drive torques of the engine and the electric motor.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a chart illustrating several running modes that are possible with the hybrid vehicle shown in FIG. 1;

DETAILED DESCRIPTION OF THE PREFERRED EMBODIMENTS

Figure 1:
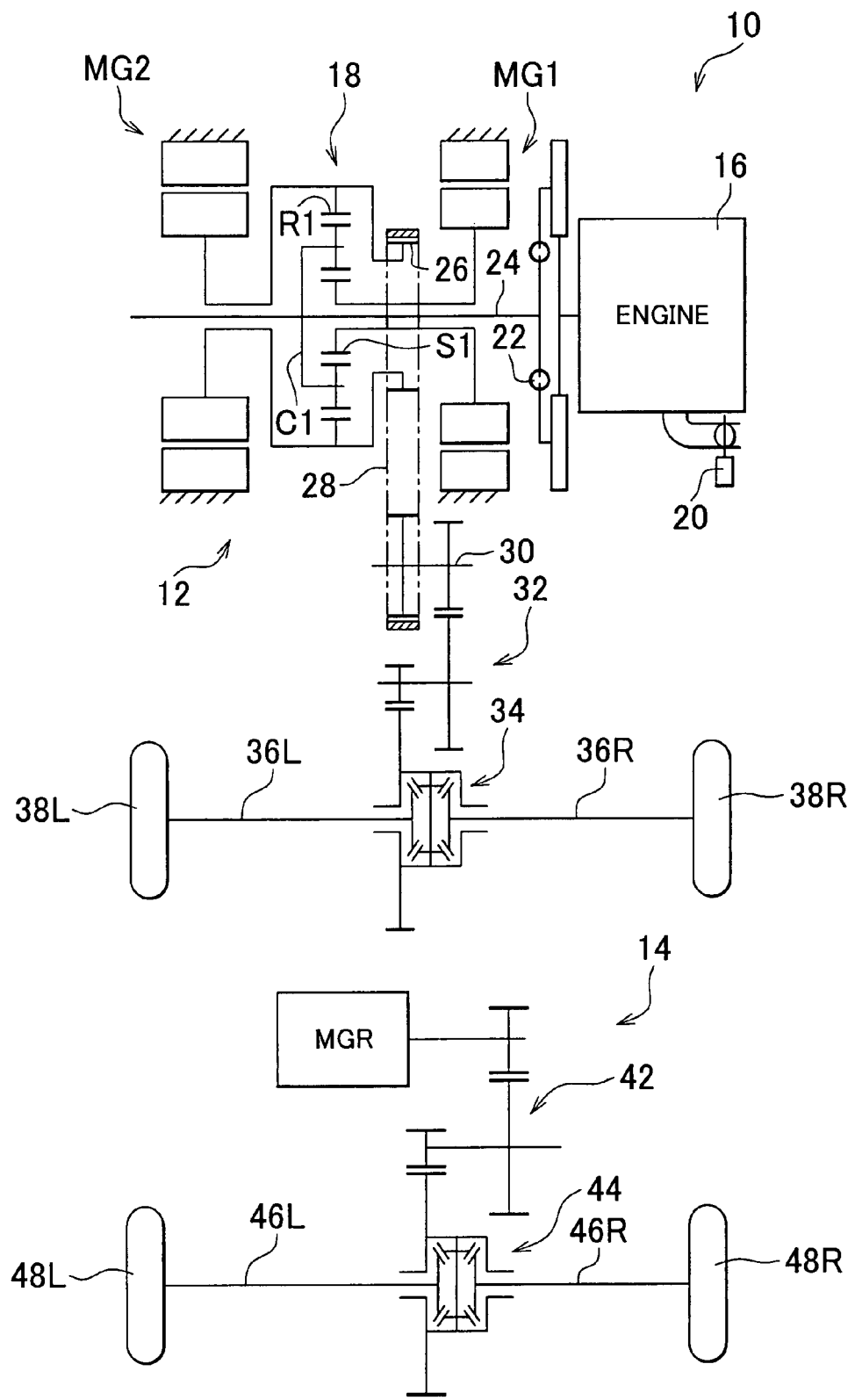
FIG. 1 is a structural view of a power transmitting device of a four-wheel-drive type hybrid vehicle according to a first example embodiment of the invention.

Hereinafter, a first example embodiment of the invention will be described in detail with reference to the drawings. FIG. 1 is a structural view of a power transmitting device of a four-wheel-drive hybrid vehicle 10 to which the invention has been applied. This hybrid vehicle 10 is provided with a main drive system 12 that drives front wheels 38R and 38L, and an auxiliary drive system 14 that drives rear wheels 48R and 48L. The main drive system 12 may be regarded as a first drive portion and the auxiliary drive system 14 may be regarded as a second drive portion.

The main drive system 12 includes an engine 16, which is an internal combustion engine, that generates power by burning fuel, a first motor-generator MG1 and a second motor-generator MG2, which each selectively function as an electric motor and a generator, and a single pinion type planetary gear set 18, all of which are provided on the same axis. The engine 16 includes a throttle actuator 20 that electronically controls the opening amount $\theta_{TH}$ of a throttle valve that controls the intake air amount in an intake pipe of the engine 16. The engine 16 is mechanically connected to an input shaft 24 via a damper 22 instead of a fluid power transmitting device such as a torque converter. The first motor-generator MG1 is mainly used as a generator and may be regarded as a third electric motor, while the second motor-generator MG2 is mainly used as an electric motor and may be regarded as a first electric motor.

The planetary gear set 18 may be regarded as a gear mechanism and functions as a power split device that divides the power from the engine 16 between an output sprocket 26, which is an output member, and the first motor-generator MG1 in the first example embodiment. That is, the input shaft 24 is integrally connected to a carrier C1 of the planetary gear set 18, while the output sprocket 26 is integrally connected to a ring gear R1 of the planetary gear set 18 and a rotor of the first motor-generator MG1 is integrally connected to a sun gear S1 of the planetary gear set 18. When the carrier C1 is driven with a predetermined amount of torque by the engine 16, the ring gear R1 and the output sprocket 26 are both driven with torque corresponding to the reaction torque (i.e., braking torque) of the first motor-generator MG1 that is connected to the sun gear S1. The output sprocket 26 is also integrally connected to a rotor of the second motor-generator MG2 and driven by the second motor-generator MG2.

The output sprocket 26 is mechanically connected to a countershaft 30 via a chain 28. Torque transmitted to the countershaft 30 is transmitted to the pair of front wheels 38R and 38L via reduction gears 32, a differential gear unit 34, and a pair of axles 36R and 36L. In FIG. 1, a steering apparatus that changes the steering angle of the front wheels 38R and 38L has been omitted.

Meanwhile, the auxiliary drive system 14 includes a rear motor-generator MGR that selectively functions as an electric motor and a generator. Torque output from the rear motor-generator MGR is transmitted to the pair of rear wheels 48R and 48L via reduction gears 42, a differential gear unit 44, and a pair of axles 46R and 46L. The rear motor-generator MGR may be regarded as a second electric motor that can regenerate energy.

Figure 2:
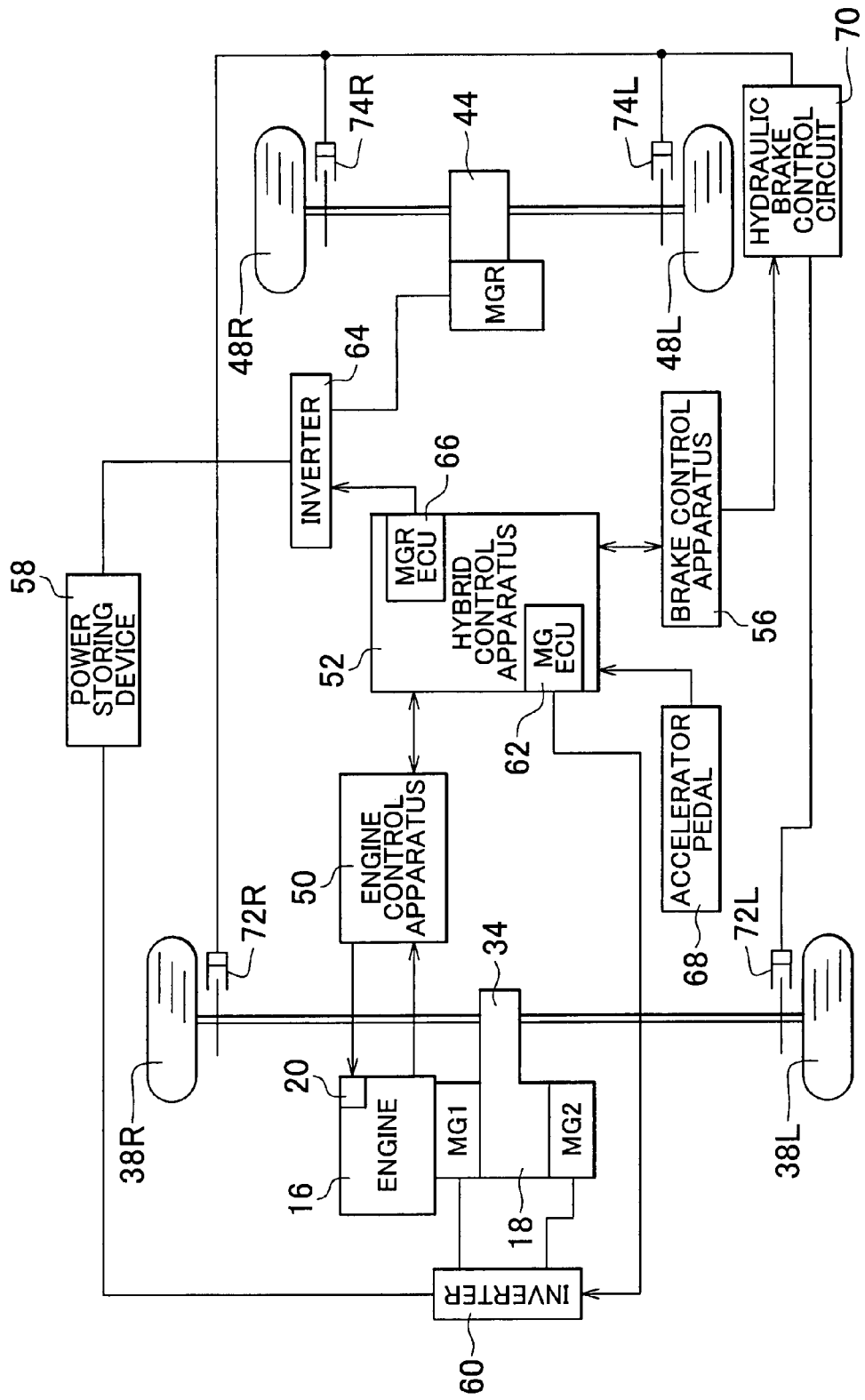
FIG. 2 is a view of a control system of the hybrid vehicle shown in FIG. 1.

FIG. 2 is a view of the main portions of a control system provided in the hybrid vehicle 10 according to the first example embodiment. An engine control apparatus 50, a hybrid control apparatus 52, and a brake control apparatus 56 are each formed of a so-called microcomputer that has a CPU, RAM, ROM, and an input/output interface and the like. These control apparatuses 50, 52, and 56 process input signals according programs stored beforehand in the ROM while using the temporary storage function of the RAM, and execute various controls. Also, these control apparatuses 50, 52, and 56 communicate with each other such that when a predetermined control apparatus requires a necessary signal, the required signal is transmitted from another control apparatus to the predetermined control apparatus as appropriate.

The engine control apparatus 50 executes torque control of the engine 16, and in addition to controlling the throttle valve opening amount $\theta_{TH}$ by the throttle actuator 20, also controls fuel injection valves, not shown, in order to control the fuel injection quantity, and controls an igniter, also not shown, in order to control the ignition timing. Further, in a predetermined operating state such as during steady running, the engine control apparatus 50 controls the throttle actuator 20 and the fuel injection quantity and the like so that the engine 16 operates at optimum fuel efficiency.

The hybrid control apparatus 52 includes an MG control unit 62 and a MGR control unit 66. The MG control unit 62 controls an inverter 60 that controls, for example, the drive current supplied from a power storing device 58 such as a battery to the first motor-generator MG1 and the second motor-generator MG2, and the generated current supplied from the first motor-generator MG1 and the second motor-generator MG2 to the power storing device 58, or the generated current (i.e., drive current) supplied from the first motor-generator MG1 to the second motor-generator MG2. The MGR control unit 66 controls an inverter 64 that controls the drive current supplied from the power storing device 58 to the rear motor-generator MGR and the generated current supplied from the rear motor-generator MGR to the power storing device 58. The hybrid control apparatus 52 also switches the running mode of the vehicle between a plurality of running modes according to the operating state of the vehicle and the running environment and the like, as shown in FIG. 4, for example. In addition, the hybrid control apparatus 52 receives various signals from various sensors and the like. Some of the signals include a signal that indicates an operating amount Acc of an accelerator pedal 68, a signal that indicates the state-of-charge (SOC) of the power storing device 58, a signal that indicates the vehicle speed V, and signals that indicate the rotation speeds of the motor-generators MG1, MG2, and MGR.

The "motor two-wheel running" mode in FIG. 4 is a mode in which the engine 16 is stopped and the second motor-generator MG2 is controlled to be powered. The "motor two-wheel running" running mode is selected at times such as when running at low speeds under a light load. The "hybrid two-wheel running" mode is a mode in which the engine 16 is used as the main power source and the first motor-generator MG1 is controlled to regenerate energy. Also in the "hybrid two-wheel running" mode, the second motor-generator MG2 is controlled to be powered to assist with running using the electric energy regenerated by the first motor-generator MG1. The "hybrid two-wheel running" mode is selected at times such as when running under a light load when the SOC of the power storing device 58 is low or during steady running. The "motor four-wheel running" mode is a mode is which the engine 16 is stopped and both the second motor-generator MG2 and the rear motor-generator MGR are controlled to be powered. The "motor four-wheel running" mode is selected at times such as during takeoff from a standstill. The "hybrid four-wheel running" mode is a mode in which the engine 16 is operated and the second motor-generator MG2 and the rear motor-generator MGR are also controlled to be powered using the electric energy regenerated by the first motor-generator MG1 as well as the electric energy stored in the power storing device 58. The "hybrid four-wheel running" mode is selected at times such as when accelerating, when taking off from a standstill when the SOC of the power storing device 58 is low, or when running on a road with a low friction coefficient μ. The "deceleration braking running" mode is a mode in which braking torque is applied to the vehicle by controlling the second motor-generator MG2 and the rear motor-generator MGR to regenerate energy while the regenerated energy charges the power storing device 58. The "deceleration braking running" mode is selected at times such as during deceleration when the accelerator is not depressed. The "motor two-wheel running" mode and the "motor four-wheel running" mode are motor running modes, and the "hybrid two-wheel running" mode and the "hybrid four-wheel running" mode are hybrid running modes.

The four running modes shown in FIG. 4 are examples and are used while running forward. The second motor-generator MG2 is controlled to be powered in the reverse direction when running backward. Also, when starting the engine 16, the engine 16 is cranked by controlling the first motor-generator MG1 to be powered. Incidentally, the "white circles" in the motor-generator MG1, MG2, and MGR columns in the chart in FIG. 4 indicate that the motor-generator is being powered to generate drive torque and the "black circles" indicate that the motor-generator is being controlled to regenerate energy.

Returning now to FIG. 2, the brake control apparatus 56 controls the braking torque of wheel brakes 72R, 72L, 74R, and 74L provided on the wheels 38R, 38L, 48R and 48L, respectively, via a hydraulic brake control circuit 70. The brake control apparatus 56 receives signals that indicate the rotation speed of each wheel from wheel speed sensors provided on the respective wheels, and executes various controls such as TRC (traction control), ABS (antilock brake system) control, and VSC (vehicle stability control) to increase the stability of the vehicle when turning, braking, and taking off from a standstill on roads with a low friction coefficient μ and the like. The wheel brakes 72R, 72L, 74R, and 74L are braking devices. The brake control apparatus 56 receives signals that indicate the longitudinal acceleration G and the yaw rate and the like necessary for TRC and other control from an acceleration sensor and a yaw sensor and the like.

Figure 3:
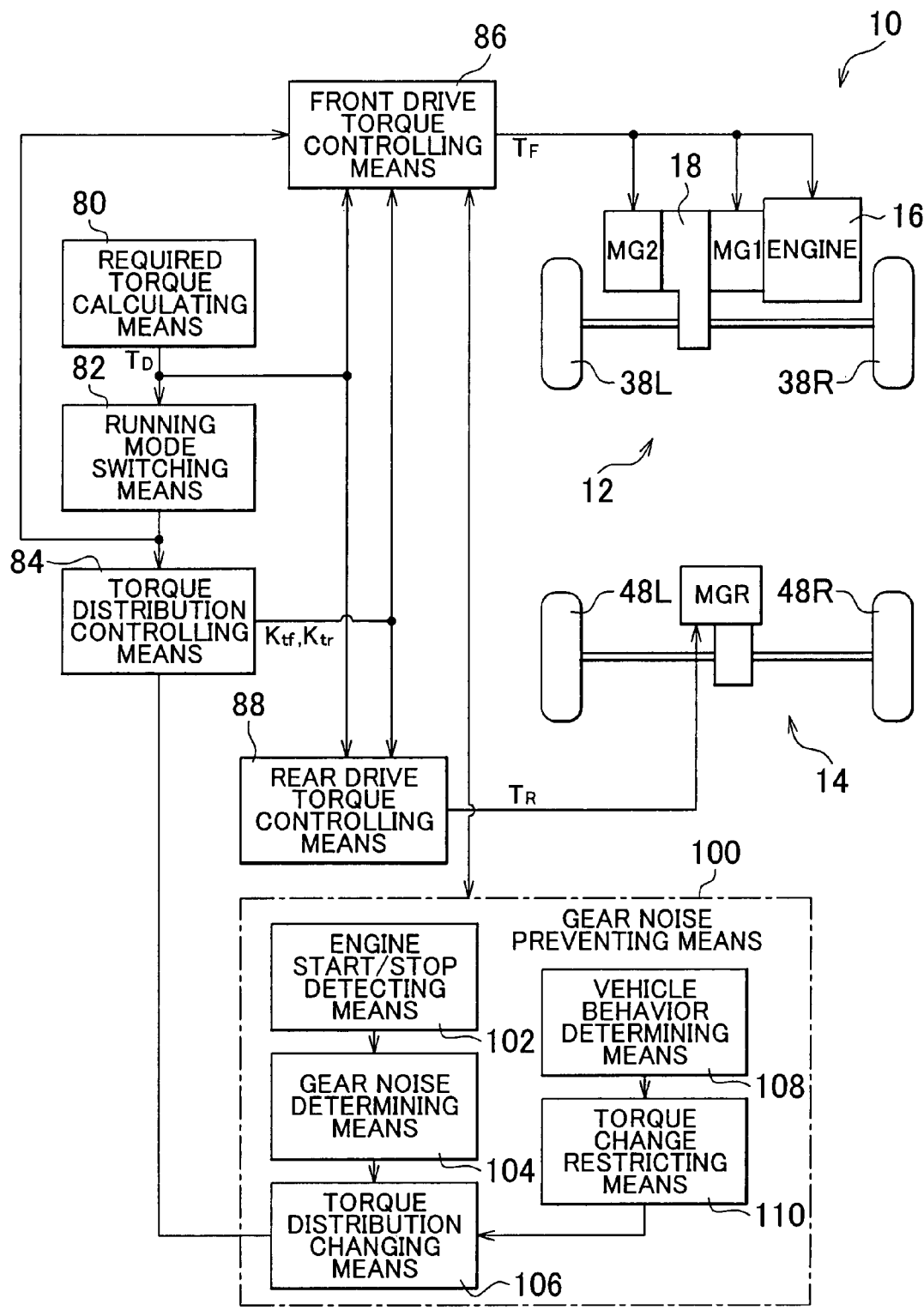
FIG. 3 is a functional block diagram of the main control function portions of the hybrid vehicle shown in FIG. 2.

FIG. 3 is a functional block diagram showing the various functions of the hybrid control apparatus 52 according to the first example embodiment. In the drawing, required torque calculating means 80 calculates a required drive torque $T_D$ that is required from the driver based on an operational expression or a preset map having the accelerator operating amount Acc and the vehicle speed V, for example, as parameters. Running mode switching means 82 selects one of the plurality of running modes shown in FIG. 4, for example, based on the required drive torque $T_D$, the vehicle speed V, the vehicle acceleration, and the SOC, and the like, and successively switches the running mode according to changes in the required drive torque $T_D$ and the like. Torque distribution controlling means 84 sets the torque distribution between the front and rear wheels according to the operating state of the vehicle and the running environment and the like when the "motor four-wheel running" mode or the "hybrid four-wheel running" mode is selected by the running mode switching means 82. The torque distribution controlling means 84 determines a load distribution ratio between the front wheels 38R and 38L and the rear wheels 48R and 48L that bear the load of the vehicle body, based on the longitudinal acceleration G detected by the acceleration sensor, for example. The torque distribution controlling means 84 also determines a front torque distribution ratio $K_{tf}$ and a rear torque distribution ratio $K_{tr}$ ($K_{tr}$ is a value less than 1; $K_{tf}+K_{tr}=1$) based on the load distribution ratio. The rear torque distribution ratio $K_{tr}$ is calculated by adding a correction value ($\sin \theta_L \times K$) to a static rear wheel load distribution ratio $K_{trw}$, for example. Here, the correction value is determined based on a road gradient angle $\theta_L$ that is obtained from the longitudinal acceleration G. In the first example embodiment, the rear torque distribution ratio $K_{tr}$ is negative so the front torque distribution ratio $K_{tf}$ may be a value greater than 1 so that $K_{tf}+K_{tr}=1$. In this case, the rear motor-generator MGR is controlled to regenerate energy so braking torque is generated. Incidentally, when the "motor two-wheel running" mode or the "hybrid two-wheel running" mode is selected by the running mode switching means 82, the front torque distribution ratio $K_{tf}$ is 1 and the rear torque distribution ratio $K_{tr}$ is 0.

Front drive torque controlling means 86 calculates front drive torque $T_F$ ($=T_D \times K_{tf}$ or $T_D-T_R$) based on the required drive torque $T_D$ that was calculated by the required torque calculating means 80 and the front torque distribution ratio $K_{tf}$ which was set by the torque distribution controlling means 84 or the rear drive torque $T_R$. The front drive torque controlling means 86 then controls the torques of the engine 16 and the motor-generators MG1 and MG2 to obtain the front drive torque $T_F$. The front drive torque controlling means 86 also controls the torque of the second motor-generator MG2 and stops or starts the engine 16 according to the running mode selected by the running mode switching means 82. Rear drive torque controlling means 88 calculates rear drive torque $T_R$ (=$T_D \times K_{tr}$ or $T_D - T_F$) based on the required drive torque $T_D$ that was calculated by the required torque calculating means 80 and the rear torque distribution ratio $K_{tr}$ which was set by the torque distribution controlling means 84 or the front drive torque $T_F$. The rear drive torque controlling means 88 then controls the torque of the rear motor-generator MGR to obtain that rear drive torque $T_R$. By controlling the front and rear drive torques $T_F$ and $T_R$ in this way, the required drive torque $T_D$ from the driver is generated for the overall vehicle. The torque controls of the motor-generators MG1, MG2, and MGR include not only powering control that generates powering torque, but also regenerative control that generates braking torque.

Here, when the front drive torque $T_F$ is relatively small and the engine 16 is started or stopped due to switching between a "hybrid running" mode and a "motor running" mode, relatively large torque fluctuation occurs when the engine 16 is started or stopped. As a result, the front drive torque $T_F$ temporarily becomes equal to or less than zero due to the torque fluctuation in the engine 16, which may produce gear noise by the backlash of gears in the planetary gear set 18, which may result in a loss of comfort. Therefore, the hybrid control apparatus 52 in the first example embodiment is provided with gear noise preventing means 100 for preventing gear noise from being produced by changing the torque distribution between the front and rear wheels and increasing the front drive torque $T_F$ when this kind of gear noise may be produced.

Figure 5:
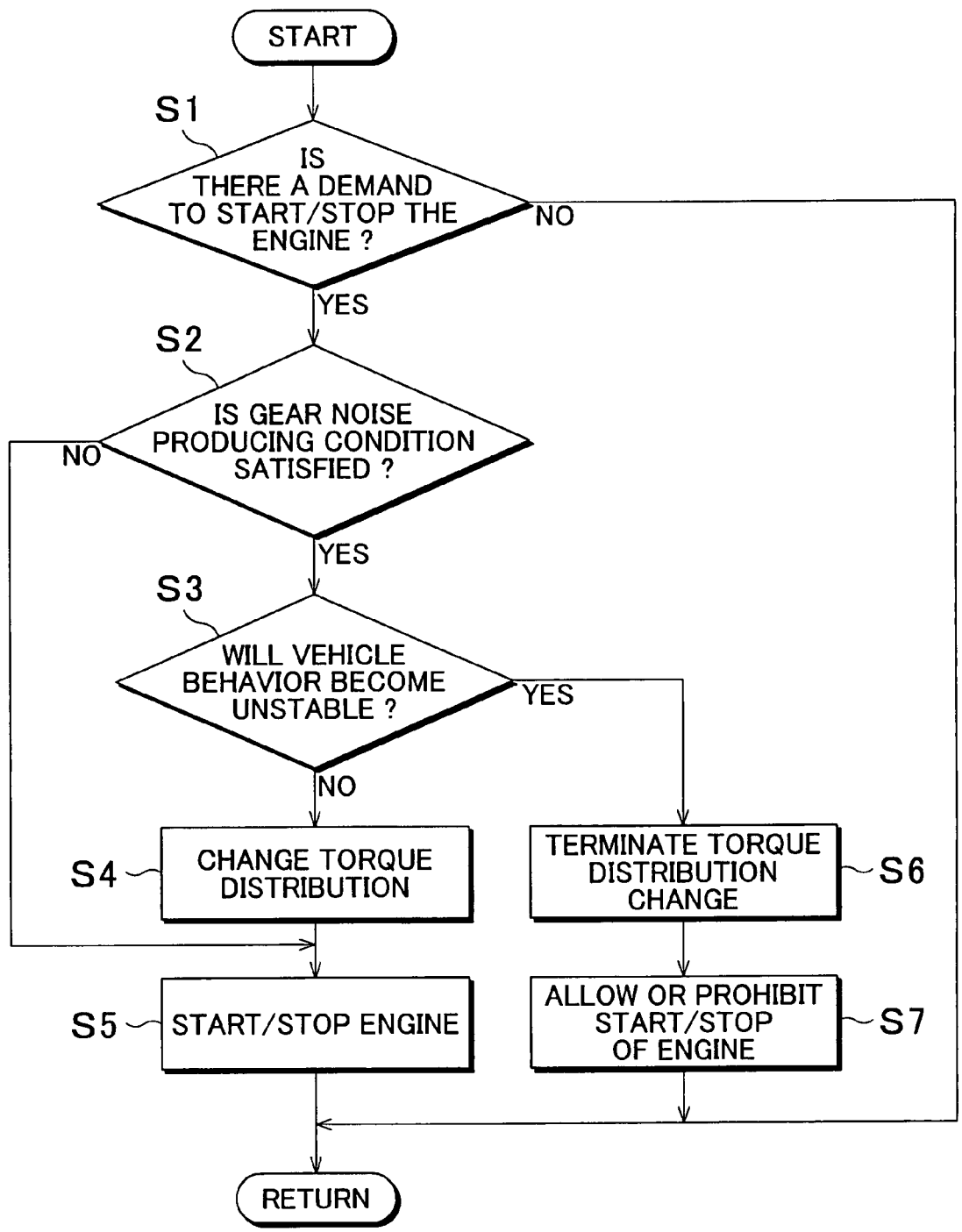
FIG. 5 is a flowchart illustrating a specific routine related to gear noise preventing means shown in FIG. 3.
Figure 6:
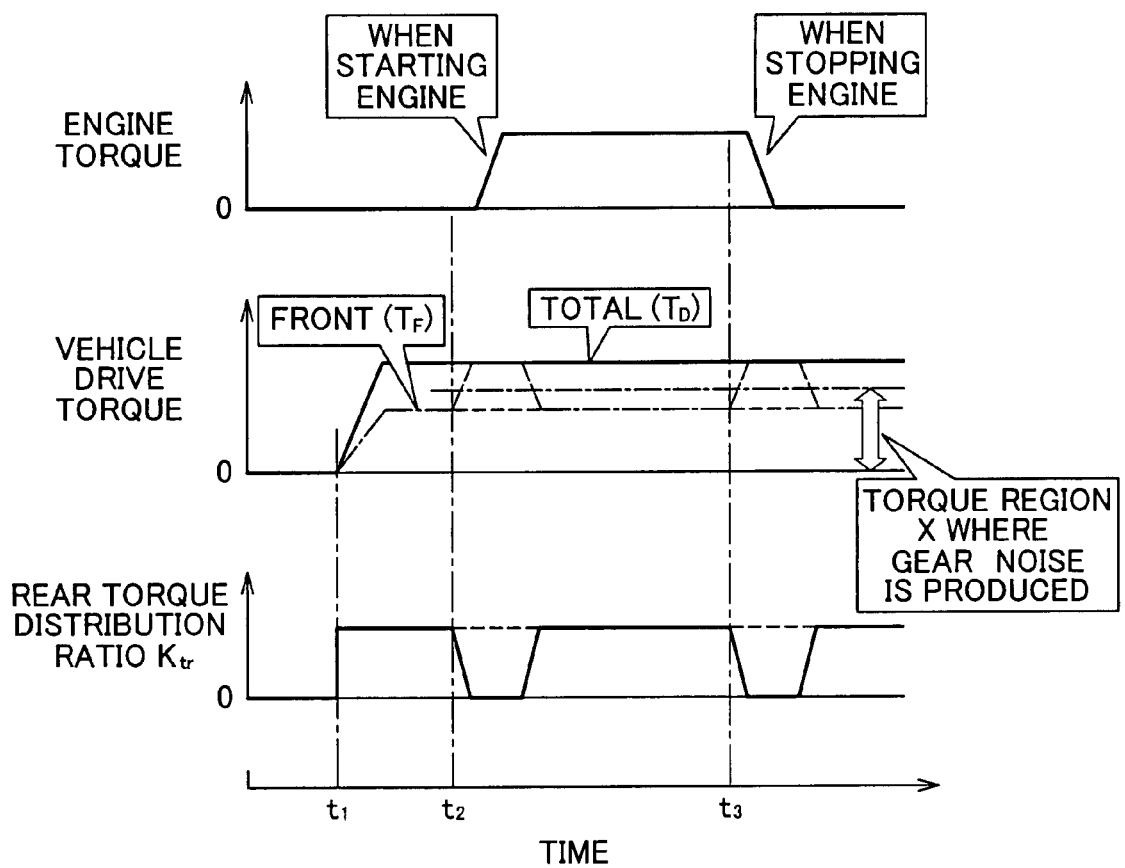
FIG. 6 is one example of a time chart showing the change in the torque of each portion and the rear torque distribution ratio when gear noise prevention control is performed according to the flowchart shown in FIG. 5.
Figure 7:
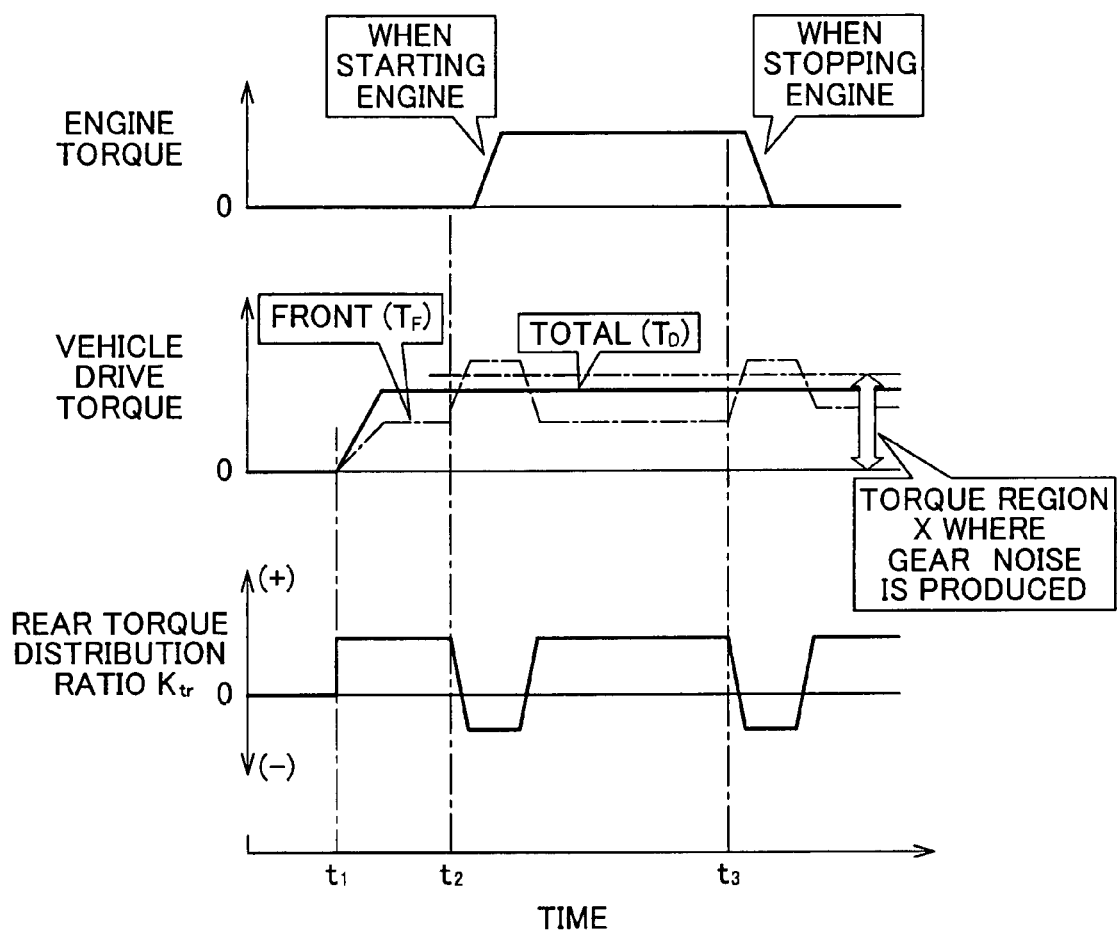
FIG. 7 is another example of a time chart showing the change in the torque of each portion and the rear torque distribution ratio when gear noise prevention control is performed according to the flowchart shown in FIG. 5.

The gear noise preventing means 100 shown in FIG. 3 functionally includes engine starting/stopping detecting means 102, gear noise determining means 104, torque distribution changing means 106, vehicle behavior determining means 108, and torque change restricting means 110, and processes signals according to the flowchart shown in FIG. 5. Step S1 in FIG. 5 may be regarded as the engine starting/stopping detecting means 102. Step S2 maybe regarded as the gear noise determining means 104. Step S4 may be regarded as the torque distribution changing means 106. Step S3 may be regarded as the vehicle stability determining means 108. Step S6 may be regarded as the torque change restricting means 110. Also, FIGS. 6 and 7 are examples of time charts showing the changes in the engine torque, vehicle drive torque, and the rear torque distribution ratio $K_{tr}$ when gear noise prevention control is performed by this gear noise preventing means 100. The vehicle behavior determining means 108 may be regarded as vehicle behavior determining means, and in the first example embodiment determines whether the vehicle behavior will become unstable.

In step S1 in FIG. 5 it is determined whether a demand to start or stop the engine 16 has been supplied to the front drive torque controlling means 86 by the running mode switching means 82 making a determination to switch between a hybrid running mode and a motor running mode. If there is no demand to start or stop the engine 16, this cycle of the routine directly ends. If, on the other hand, there is a demand to start or stop the engine 16, steps S2 and thereafter are executed.

Time $t_1$ in FIGS. 6 and 7 is the time at which takeoff control that controls the vehicle at takeoff from a standstill in the "motor four-wheel running" mode is started by a depression of the accelerator pedal 68. At this time, the front wheels 38R and 38L and the rear wheels 48R and 48L are driven with a predetermined torque distribution. Also, time $t_2$ is the time at which the determination in step S1 is YES due to a demand to start the engine 16 by a determination to switch from the "motor four-wheel running" mode to the "hybrid four-wheel running" mode. Time $t_3$ is the time at which the determination in step S1 is YES due to a demand to stop the engine 16 by a determination to switch from the "hybrid four-wheel running" mode to the "motor four-wheel running" mode. Incidentally, in the "vehicle drive torque" column in FIGS. 6 and 7, the total drive torque indicated by the solid line is the same amount as the required drive torque $T_D$, and the difference between the total drive torque $T_D$ and the front drive torque $T_F$ indicated by the alternate long and short dash line (i.e., $T_D - T_F$) is the rear drive torque $T_R$.

In step S2 it is determined whether a predetermined gear noise producing condition is satisfied. This gear noise producing condition is satisfied when the front drive torque $T_F$ within a predetermined torque region X where gear noise is produced (see FIGS. 6 and 7). The gear noise producing torque region X is a relatively low torque region in which the front drive torque $T_F$ changes to equal to or less than the zero point according to torque fluctuation when the engine 16 starts or stops. The gear noise producing torque region X is set based on the torque fluctuation range when the engine 16 is started or stopped. When the torque fluctuation range is different when the engine 16 is started compared to when the engine 16 is stopped, the gear noise producing torque region X may be set separately. That is, one gear noise producing torque region is set when the engine 16 is started and another gear noise producing torque region may set when the engine 16 is stopped. Also, the gear noise producing condition may also be set based on the torque of the output sprocket 26 which is the output member of the main drive system 12 or set based only on the torque of the second motor-generator MG2. When the front drive torque $T_F$ is higher than the gear noise producing torque region X, step S5 in FIG. 5 is immediately executed and the execution of starting control or stopping control of the engine 16 by the front drive torque controlling means 86 is allowed. On the other hand, when the front drive torque $T_F$ is within the gear noise producing torque region X, steps S3 thereafter are in FIG. 5 and executed.

In step S3 in FIG. 5 it is determined whether the behavior of the vehicle will become unstable if the torque distribution ratio between the front and rear wheels will be changed in order to prevent gear noise from being produced. If there is a possibility of the vehicle behavior becoming unstable, steps S6 and thereafter are executed. If not, step S4 is executed. The determination of whether the vehicle behavior will become unstable is made such that it is determined (i.e., predicted) that the vehicle behavior will become unstable when the friction coefficient μ of the road is low. Whether the friction coefficient μ of the road is low can be determined from, for example, the slip state of the wheels 38R, 38L, 48R, and 48L or the outside air temperature. This determination can also be made used using road condition information and the like provided from an external source such as VICS (Vehicle Information and Communication System). In addition, the determination of whether the vehicle behavior will become unstable may be made taking into account the road gradient, steering angle, vehicle speed V, longitudinal acceleration G, and yaw rate and the like.

When it is determined in step S3 that the vehicle behavior is not likely to become unstable, step S4 is executed and the front torque distribution ratio $K_{tf}$ and the rear torque distribution ratio $K_{tr}$ are changed so that the front drive torque $T_F$ exceeds the gear noise producing torque region X. More specifically, it is determined whether the front drive torque $T_F$ exceeds the gear noise producing torque region X when the front torque distribution ratio $K_{tf}$ will be 1 and the rear torque distribution $K_{tr}$ will be 0. If the front drive torque $T_F$ is exceeds the gear noise producing torque region X when $K_{tf}$ will be 1 and $K_{tr}$ will be 0, the running mode is switched to the "hybrid two-wheel running" mode in which the vehicle runs substantially using only the main drive system 12 by setting the front torque distribution $K_{tf}$ to 1 and the rear torque distribution ratio $K_{tr}$ to 0. Also, if the front drive torque $T_F$ does not exceed the gear noise producing torque region X by simply making $K_{tf}=1$ and $K_{tr}=0$, then the front torque distribution ratio $K_{tf}$ is increased to more than 1 so that the front drive torque $T_F$ will exceed the gear noise producing torque region X and the rear torque distribution ratio $K_{tr}$ is set negative. Changing the front torque distribution ratio $K_{tf}$ and the rear torque distribution ratio $K_{tr}$ in this way causes the front drive torque controlling means 86 to increase the torque of the second motor-generator MG2 in the front main drive system 12 and causes the rear drive torque controlling means 88 to reduce the torque of the rear motor-generator MGR in the rear auxiliary drive system 14.

When the torque distribution is changed in this way such that the front drive torque $T_F$ exceeds the gear noise producing torque region X, step S5 is executed so the engine 16 is started or stopped. Accordingly, gear noise is prevented from being produced due to backlash of the gears in the planetary gear set 18 regardless of the relatively large torque fluctuation that occurs when the engine 16 is started or stopped. The torque distribution changing control in step S4 is ended after the engine 16 has been completely started or stopped for a fixed period of time or after it has been confirmed that the engine has started or stopped, after which the torque distribution returns to the original torque distribution.

FIG. 6 shows a case in which the front torque distribution ratio $K_{tf}$ is set to 1 and the rear torque distribution ratio $K_{tr}$ is set to 0 after the torque distribution has been changed in step S4. The dotted lines in the "vehicle drive torque" and "rear torque distribution ratio $K_{tr}$" sections of the graph in FIG. 6 represent the front drive torque $T_F$ and the rear torque distribution ratio $K_{tr}$, respectively, when gear noise prevention control is not performed. The front drive torque $T_F$ is within the gear noise producing torque region X when the engine 16 is started or stopped so gear noise may be produced at the planetary gear set 18.

Also, FIG. 7 shows a case in which the front torque distribution ratio $K_{tf}$ is set to greater than 1 while the rear torque distribution ratio $K_{tr}$ is set negative, because the front drive torque $T_F$ is unable to move out of the gear noise torque region X by simply setting the front torque distribution ratio $K_{tf}$ to 1 and the rear torque distribution ratio $K_{tr}$ to 0. In this case, the rear motor-generator MGR of the auxiliary drive system 14 is controlled to regenerate energy by the rear drive torque controlling means 88, thus generating braking torque. As a result, the gear noise from backlash of the gears in the planetary gear set 18 of the main drive system 12 may be prevented even when the total drive torque $T_D$ is relatively small, that is, the total drive torque $T_D$ is within the gear noise producing torque region X.

The torque distribution changing means 106 that executes step S4, functions as torque changing means for increasing the torque of the second motor-generator MG2 so that the front drive torque $T_F$ will move outside of the gear noise producing torque region X, and functions as drive torque change canceling means for reducing the rear drive torque $T_R$ so that the change in the drive torque following that increase in torque of the second motor-generator MG2 is cancelled out.

In addition, vehicle behavior detecting means for detecting whether the vehicle behavior is actually starting to become unstable due to, for example, a difference in the rotational speeds of the wheels 38R, 38L, 48R, and 48L either after the torque distribution changing means 106 has actually changed the torque distribution in step S4 or while it is gradually changing the torque distribution in step S4, may be provided separately from or instead of the vehicle behavior determining means 108. When the vehicle behavior detecting means detects that the vehicle is actually starting to become unstable, the torque distribution changing means 106 may stop changing the torque distribution and return the torque distribution to the original torque distribution.

If, on the other hand, the determination in step S3 is YES, i.e., if it is determined that the vehicle behavior will become unstable, then the change in the torque distribution is cancelled in step S6. Also, in step S7, starting or stopping of the engine 16 is either allowed according to a demand to start or stop the engine 16, or prohibited regardless of a demand to start or stop the engine 16 in order to prevent gear noise from being produced. This setting of whether to allow or prohibit starting or stopping of the engine 16 can be selected as appropriate at the design stage in the control program. For example, if there is a vehicle that is required highly to prevent gear noise from being produced, the setting to prohibit the engine 16 from being started or stopped until the determination in step S2 or S3 is NO regardless of a demand to start or stop the engine 16 may be selected. If there is a vehicle that is not required much to prevent gear noise from being produced, the setting to allow the engine 16 to be started or stopped according to a demand to start or stop the engine 16 may be selected. The structure may also be such that the driver can select the setting as appropriate.

In this way, in the four-wheel-drive type hybrid vehicle 10 in this first example embodiment, when the determination in step S1 is YES due to a demand to start or stop the engine 16 being supplied to the front drive torque controlling means 86 by a determination being made by the running mode switching means 82 that switches between a "hybrid running" mode and a "motor running" mode, it is then determined in step S2 whether the front drive torque $T_F$ is within the gear noise producing torque region X. When the front drive torque $T_F$ is within the gear noise producing torque region X, steps S3 and thereafter are executed. In step S4 the torque distribution between the front and rear wheels is changed, with the torque of the second motor-generator MG2 of the front wheel side being increased which increases the front drive torque $T_F$, so that the front drive torque $T_F$ moves out of the gear noise producing torque region X. As a result, gear noise from backlash of the gears in the planetary gear set 18 is prevented regardless of a relatively large torque fluctuation that occurs when the engine 16 is started or stopped.

Also, the rear drive torque $T_R$ is reduced to cancel out the change in the drive torque following the increase in the torque of the second motor-generator MG2 of the front wheel side. Accordingly, the drive torque $T_D$ of the vehicle is appropriately prevented from changing so the drive torque $T_D$ that was required from the driver can be obtained. In this case, according to the first example embodiment, only the torque distribution ratios $K_{tf}$ and $K_{tr}$ between the front and rear wheels are changed so the drive torque control is simple and the apparatus can be made simple and inexpensively.

Also, in the first example embodiment, when the front torque distribution ratio $K_{tf}$ is set to 1 and the rear torque distribution ratio $K_{tr}$ is set to 0, it may be determined in advance whether the front drive torque $T_F$ exceeds the gear noise producing torque region X. If the front drive torque $T_F$ exceeds the gear noise producing torque region X, the front torque distribution ratio $K_{tf}$ is maintained at 1 and the rear torque distribution ratio $K_{tr}$ is maintained at 0, and the vehicle runs using only the main drive system 12. Therefore, the drive torque control according to the first example embodiment may be easier than the drive torque control where the torque distribution ratios $K_{tf}$ and $K_{tr}$ are continuously changed depending to the required drive torque $T_D$, and the front drive torque $T_F$ and the rear drive torque $T_R$ are each continuously changed according to the continuous change in the torque distribution ratios $K_{tf}$ and $K_{tr}$.

Also, according to the first example embodiment, the front torque distribution ratio $K_{tf}$ may be set to greater than 1 and the rear torque distribution ratio $K_{tr}$ maybe set negative and braking torque may be generated by controlling the rear motor-generator MGR to regenerate energy. Therefore, even if there is a greater increase in the front drive torque $T_F$ than the rear drive torque $T_R$, the change in the total drive torque $T_D$ is cancelled out.

Also, according to the first example embodiment, it may be determined whether the vehicle behavior will become unstable in step S3 before the torque distribution is changed in step S4. If it is determined that the vehicle behavior will become unstable, the change in the torque distribution is cancelled in step S6 so that the vehicle behavior is prevented from becoming unstable by changing the torque distribution to prevent gear noise from being produced.

Incidentally, in the first example embodiment, the torque distribution ratios $K_{tf}$ and $K_{tr}$ of the front and rear wheels are changed. Alternatively, however, the front drive torque $T_F$ and the rear drive torque $T_R$ may be directly changed so that the front drive torque $T_F$ will move out of the gear noise producing torque region X.

Also, the first example embodiment is aimed at preventing gear noise due to torque fluctuation that occurs when the engine 16 is started and stopped. However, even when the engine 16 is running, the front drive torque $T_F$ may temporarily become equal to or less than zero due to torque fluctuation in the engine 16 so that gear noise may occur due to backlash of the gears in the planetary gear set 18. That is, the engine 16 of the hybrid vehicle 10 typically is operated at optimum fuel efficiency and torque control of the second motor-generator MG2 is performed according to the required drive torque $T_D$. Therefore, if the engine speed is low when the engine 16 is operating at optimum fuel efficiency, there is a possibility that the torque may largely fluctuate and gear noise may be produced.

Figure 8:
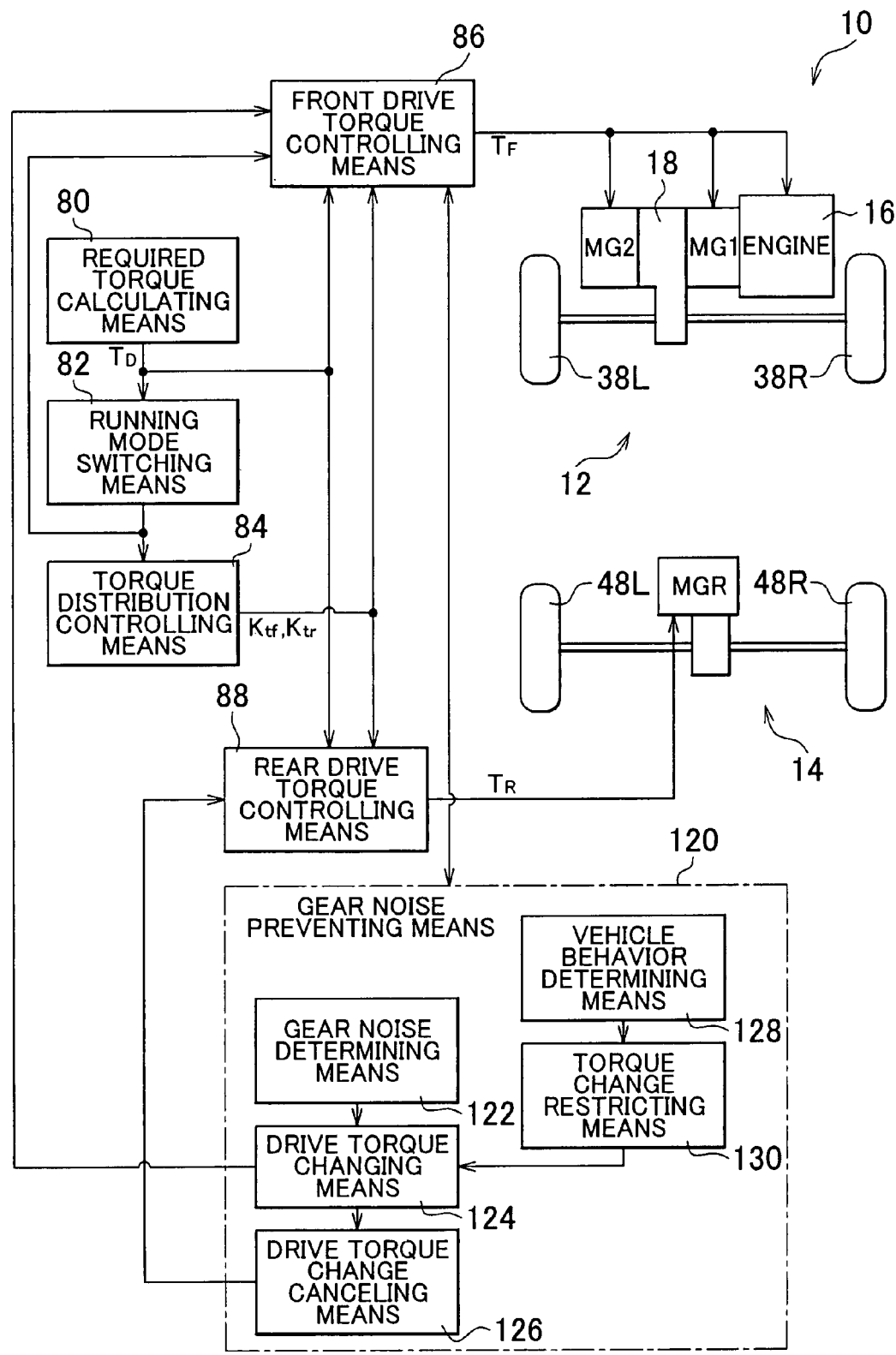
FIG. 8 is a functional block diagram of a second example embodiment of the invention, and corresponds to FIG. 3.
Figure 10:
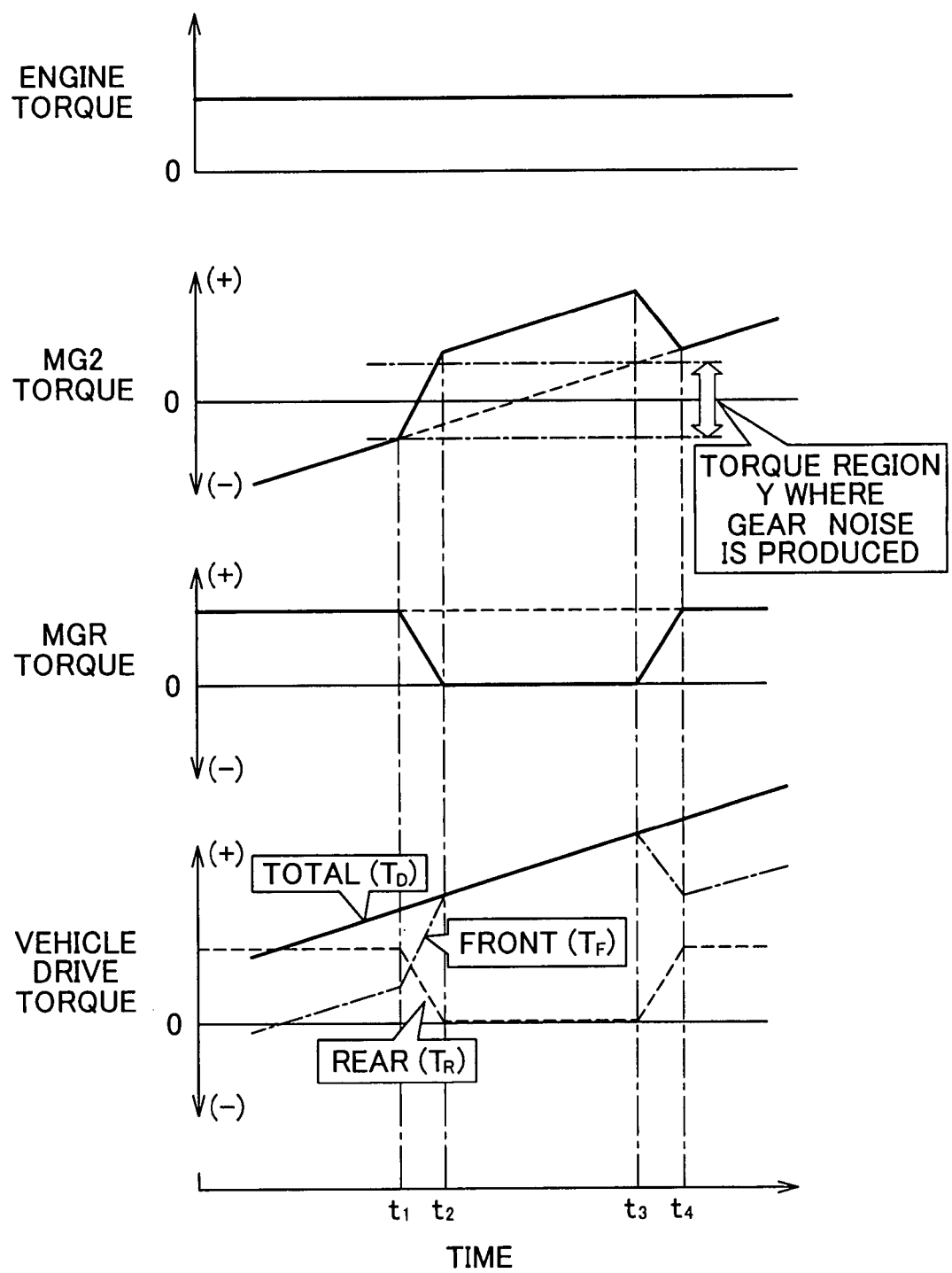
FIG. 10 is one example of a time chart showing the change in the torque of each portion when gear noise prevention control is performed according to the flowchart shown in FIG. 9.
Figure 11:
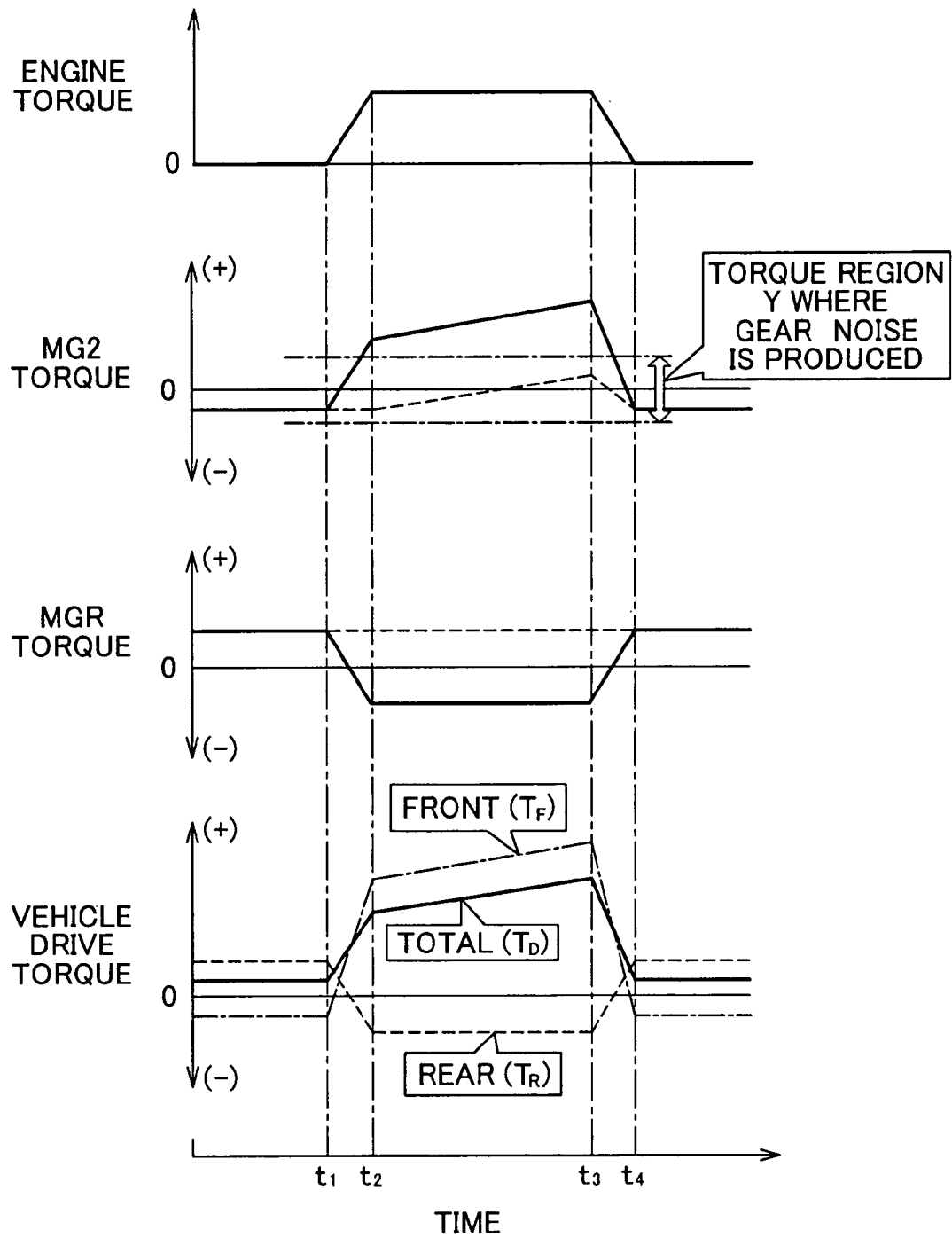
FIG. 11 is another example of a time chart showing the change in the torque of each portion when gear noise prevention control is performed according to the flowchart shown in FIG. 9.

Hereinafter, a second example embodiment of the invention will be described in detail with reference to the drawings. FIG. 8 is a functional block diagram of the second example embodiment of the invention, and corresponds to FIG. 3. Gear noise preventing means 120 in FIG. 8 prevents gear noise due to backlash of gears in the planetary gear set 18 from being produced. The backlash of gears in the planetary gear set 18 may occur when the front drive torque $T_F$ temporarily becoming equal to or less than zero from torque fluctuation while the engine 16 is operating. The gear noise preventing means 120 functionally includes gear noise determining means 122, drive torque changing means 124, drive torque change canceling means 126, vehicle behavior determining means 128, and torque change restricting means 130, and processes signals according to the flowchart in FIG. 9. Step R2 in FIG. 9 may be regarded as the gear noise determining means 122. Step R4 may be regarded as the drive torque changing means 124. Step R5 may be regarded as the drive torque change canceling means 126. Step R3 may be regarded as the vehicle behavior determining means 128. Step R6 may be regarded as the torque change restricting means 130. Also, FIGS. 10 and 11 are examples of time charts showing the changes in the vehicle drive torque, the torque of the second motor-generator MG2, and the torque of the rear motor-generator MGR when gear noise prevention control is performed by the gear noise preventing means 120. FIG. 10 shows a case in which the vehicle is accelerating in the "hybrid four-wheel running" mode, and FIG. 11 shows a case in which the running mode has been temporarily switched to the "hybrid four-wheel running" mode while running in the "motor four-wheel running" mode. Incidentally, steps R3 and R6 in FIG. 9 are signal-processing steps that are essentially the same as steps S3 and S6 in FIG. 5, respectively, so detailed descriptions thereof will be omitted.

Figure 9:
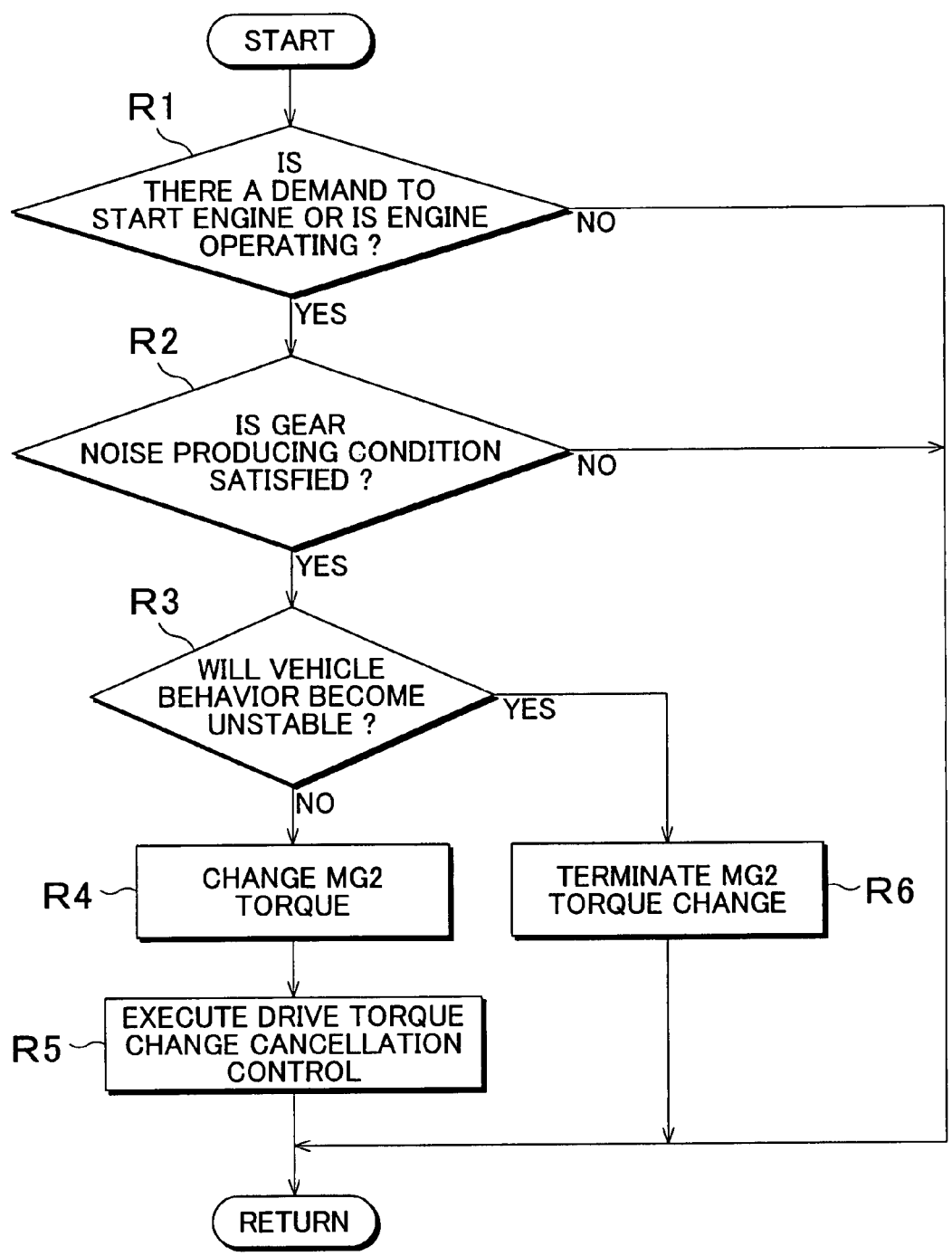
FIG. 9 is a flowchart illustrating a specific routine related to gear noise preventing means shown in FIG. 8.

In step R1 in FIG. 9 it is determined whether the engine 16 is operating or whether there was a demand to start the engine 16 while the engine is stopped. When the engine 16 is operating or there is a demand to start the engine 16, steps R2 and thereafter are executed. In step R2 it is determined whether a predetermined gear noise producing condition is satisfied. The gear noise producing condition is satisfied when the torque of the second motor-generator MG2 of the front wheel side (i.e., MG2 torque) is within a predetermined torque region Y where gear noise is produced (see FIGS. 10 and 11). The gear noise producing torque region Y is a relatively low torque region in which the front drive torque $T_F$ changes to equal to or less than the zero point due to torque fluctuation that occurs when the engine 16 is operating at optimum fuel efficiency, and is set based on the torque fluctuation range when the engine 16 is operating at optimum fuel efficiency. As in the first example embodiment, the gear noise producing condition may be set based on the front drive torque $T_F$ to which the torque of the engine 16 has been added. Alternatively, the gear noise producing condition may be set based on the torque of the output sprocket 26 which is the output member of the main drive system 12. When the MG2 torque is outside of the gear noise producing torque region Y, gear noise will not occur so this cycle of the routine directly ends. When there is a demand to start the engine 16, the engine 16 is allowed to start. If, on the other hand, when the MG2 torque is within the gear noise producing torque region Y, steps R3 and thereafter are executed.

In step R3, it is determined whether the behavior of the vehicle will become unstable if the torques of the front and rear wheels will be changed in order to prevent gear noise from being produced, just as in step S3 in the first example embodiment. If it is determined that the vehicle behavior will not become unstable, steps R4 and R5 are executed. That is, the front drive torque $T_F$ is increased in step R4 so that the torque of the second motor-generator MG2 exceeds the gear noise producing torque region Y, and the rear drive torque $T_R$ is decreased in step R5 to cancel out the increase in the front drive torque $T_F$. More specifically, when it is assumed that the rear drive torque $T_R$ is decreased to a predetermined set value such as zero, and the front drive torque $T_F$ is increased according to the amount of the decrease in the rear drive torque $T_R$, it is determined whether the MG2 torque that is increased according to the increase in the front drive torque $T_F$ exceeds the gear noise producing torque region Y. If it is determined that the MG2 torque exceeds the gear noise producing torque region Y, the front drive torque $T_F$ is increased by the assumed amount in step R4 and the rear drive torque $T_R$ is set to the assumed value, i.e., zero in step R5. Then only the front drive torque $T_F$ is controlled according to a change in the required drive torque $T_D$ thereafter and the running mode is switched to the "hybrid two-wheel running" mode in which the vehicle runs substantially using only the main drive system 12. On the other hand, if the MG2 torque does not exceed the gear noise producing torque region Y even after it is assumed that the rear drive torque $T_R$ is reduced to zero and the front drive torque $T_F$ is increased according to the amount of the decrease in the rear drive torque $T_R$, the front drive torque $T_F$ is set to the value that the MG2 torque will exceed the gear noise producing torque region Y, and the rear torque $T_R$ is maintained at a constant negative value to cancel out the increase in the front drive torque $T_F$. Only the front drive torque $T_F$ is controlled in response to a change in the required drive torque $T_D$ thereafter.

By changing the front drive torque $T_F$ and the rear drive torque $T_R$ in this way, the torque of the second motor-generator MG2 of the main drive system 12 in the front wheel side is increased by the front drive torque controlling means 86. Meanwhile, the torque of the rear motor-generator MGR of the auxiliary drive system 14 in the rear side is reduced by the rear drive torque controlling means 88. Then, by performing drive torque control on the front and rear wheels so that the MG2 torque exceeds the gear noise producing torque region Y in this way, gear noise due to backlash of the gears in the planetary gear set 18 can be prevented regardless of torque fluctuation in the engine 16.

Time $t_1$ in FIG. 10 is the time at which the MG2 torque is increased and enters the gear noise producing torque region Y (and the braking torque is decreased) according to the increase in the required drive torque $T_D$ when running while the engine 16 is operating at optimum fuel efficiency. Time $t_1$ in FIG. 10 is also the time at which torque changing control in step R4 and cancellation control in step R5 start. Further, time $t_3$ is the time at which the torque of the second motor-generator MG2 while gear noise prevention control is not performed (i.e., the torque indicated by the dotted line), moves out of the gear noise producing torque region Y which causes the torque changing control in step R4 and the cancellation control in step R5 to end. That is, FIG. 10 shows a case in which gear noise caused by torque fluctuation in the engine 16 is prevented by reducing the rear drive torque $T_R$ to zero and increasing the front drive torque $T_F$ according to the amount of the decrease in the rear drive torque $T_R$, and substantially switching to the "hybrid two-wheel running" mode. Time $t_1$ to time $t_2$, and time $t_3$ to time $t_4$ in FIG. 10 are transitional times when the torque is changing and being returned, respectively. During these times gear noise is prevented while suppressing a sudden change in the front drive torque $T_F$ and the rear drive torque $T_R$. The dotted lines in the graphs of the MG2 torque and the MGR torque in FIG. 10 indicate the torque value when gear noise prevention control is not performed. When gear noise prevention control in the second example embodiment is not performed, gear noise may occur in the planetary gear set 18 due to torque fluctuation in the engine 16 from time $t_1$ to time $t_3$ during which time the MG2 torque is within the gear noise producing torque region Y.

Also, time $t_1$ in FIG. 11 is the time at which the torque changing control in step R4 and the cancellation control in step R5 start when there is a demand to start the engine 16 when the MG2 torque is within the gear noise producing torque region Y. Also, time $t_3$ in FIG. 11 is the time at which control to stop the engine 16 is started, which causes the torque changing control in step R4 and the cancellation control in step R5 to end. That is, FIG. 11 shows a case in which gear noise due to torque fluctuation in the engine 16 is prevented by largely increasing the front drive torque $T_F$ so that the MG2 torque exceeds the gear noise producing torque region Y by making the rear drive torque $T_R$ negative, i.e., controlling the rear motor-generator MGR to regenerate energy and thus generate a predetermined amount of braking torque, when the MG2 torque does not exceed the gear noise producing torque region Y even when the rear drive torque $T_R$ is reduced to zero and the front drive torque $T_F$ is increased according to the amount of the decrease in the rear drive torque $T_R$. Time $t_1$ to time $t_2$, and time $t_3$ to time $t_4$ in FIG. 11 are transitional times when the torque is changing and being returned, respectively. During these times gear noise is prevented while suppressing a sudden change in the front drive torque $T_F$ and the rear drive torque $T_R$. The dotted lines in the graphs of the MG2 torque and the MGR torque in FIG. 11 indicate the torque value when gear noise prevention control is not executed. When gear noise prevention control in the second example embodiment is not performed, gear noise may occur in the planetary gear set 18 due to torque fluctuation in the engine 16 from time $t_1$ to time $t_4$, during which time the MG2 torque is within the gear noise producing torque region Y and the engine 16 is being operated.

In FIGS. 10 and 11, the "FRONT ($T_F$)", indicated by the alternate long and short dash line in the "vehicle drive torque" section in FIGS. 10 and 11, refers to the front drive torque $T_F$ and corresponds to the sum of the engine torque and the MG2 torque according to the gear ratio of the planetary gear set 18 and the like. Also, the "REAR ($T_R$)" indicated by the dotted line in the "vehicle drive torque" section refers to the rear drive torque $T_R$ and corresponds to the MGR torque.

If, on the other hand, if it is determined that the vehicle behavior will become unstable (YES in step R3), step R6 is executed, whereby the increase control of the front drive torque $T_F$ in step R4 and the cancellation control in step R5 are terminated. Accordingly, the unstable vehicle behavior, due to changes in the respective drive torques $T_F$ and $T_R$ of the front and rear wheels in order to prevent gear noise from being produced, is prevented.

In the second example embodiment, when the engine 16 is running or there is a demand to start the engine 16, it is determined in step R2 whether the MG2 torque is within the gear noise producing torque region Y. If the MG2 torque is within the gear noise producing torque region Y, steps R3 and thereafter are executed. In step R4, the front drive torque $T_F$ is increased so that the MG2 torque will move out of the gear noise producing torque region Y. Accordingly, gear noise due to backlash of the gears in the planetary gear set 18 is prevented, regardless of torque fluctuation in the engine 16 when the engine 16 is operated at optimum fuel efficiency.

Also, in step R5 the rear drive torque $T_R$ is reduced to cancel out the change in the drive torque following the increase in the front drive torque $T_F$. Therefore, the drive torque of the vehicle is appropriately prevented from changing due to the increase in the front drive torque $T_F$ in order to prevent the gear noise, so the drive torque $T_D$ that was required from the driver can be obtained.

Also, in the second example embodiment, when the rear drive torque $T_R$ is reduced to zero, the front drive torque $T_F$ is increased according to the amount of the decrease in the rear drive torque $T_R$. It is then determined whether the MG2 torque exceeds the gear noise producing torque region Y following the increase in the front drive torque $T_F$. If it is determined that the MG2 torque exceeds the gear noise producing torque region Y, the rear drive torque $T_R$ is maintained at 0 and the vehicle runs substantially using only the main drive system 12 in the "hybrid two-wheel running" mode. Therefore, the drive torque control in the second example embodiment is easier than the drive torque control where the front drive torque $T_F$ and the rear drive torque $T_R$ are each continuously changed according to the required drive torque $T_D$. Also, as shown in FIG. 11, even if the rear drive torque $T_R$ is set to negative, it is maintained at a constant value. Therefore, the drive torque control in the second example embodiment is easier than the drive torque control where the front drive torque $T_F$ and the rear drive torque $T_R$ are each continuously changed according to the required drive torque $T_D$.

Also, in the second example embodiment, the rear drive torque $T_R$ may be set negative, and the rear motor-generator MGR is controlled to regenerate energy so braking torque may be generated as necessary. Therefore, even if there is a larger increase in the front drive torque $T_F$ than the rear drive torque $T_R$, in order to prevent gear noise from being produced, the change in the total drive torque may be cancelled out by generating braking torque according to controlling the rear motor-generator MGR to regenerate energy.

Also, in the second example embodiment, it is determined in step R3 whether the vehicle behavior will become unstable before the increase control and cancellation control (i.e., the reduction of rear drive torque $T_R$) of the front drive torque $T_F$ are performed in steps R4 and R5, respectively. If it is determined that the vehicle behavior will become unstable, the increase control and cancellation control of the front drive torque $T_F$ are cancelled in step R6. Accordingly, the vehicle behavior may be prevented from becoming unstable due to a change in the drive torques $T_F$ and $T_R$ of the front and rear wheels in order to prevent gear noise from being produced.

Figure 12:
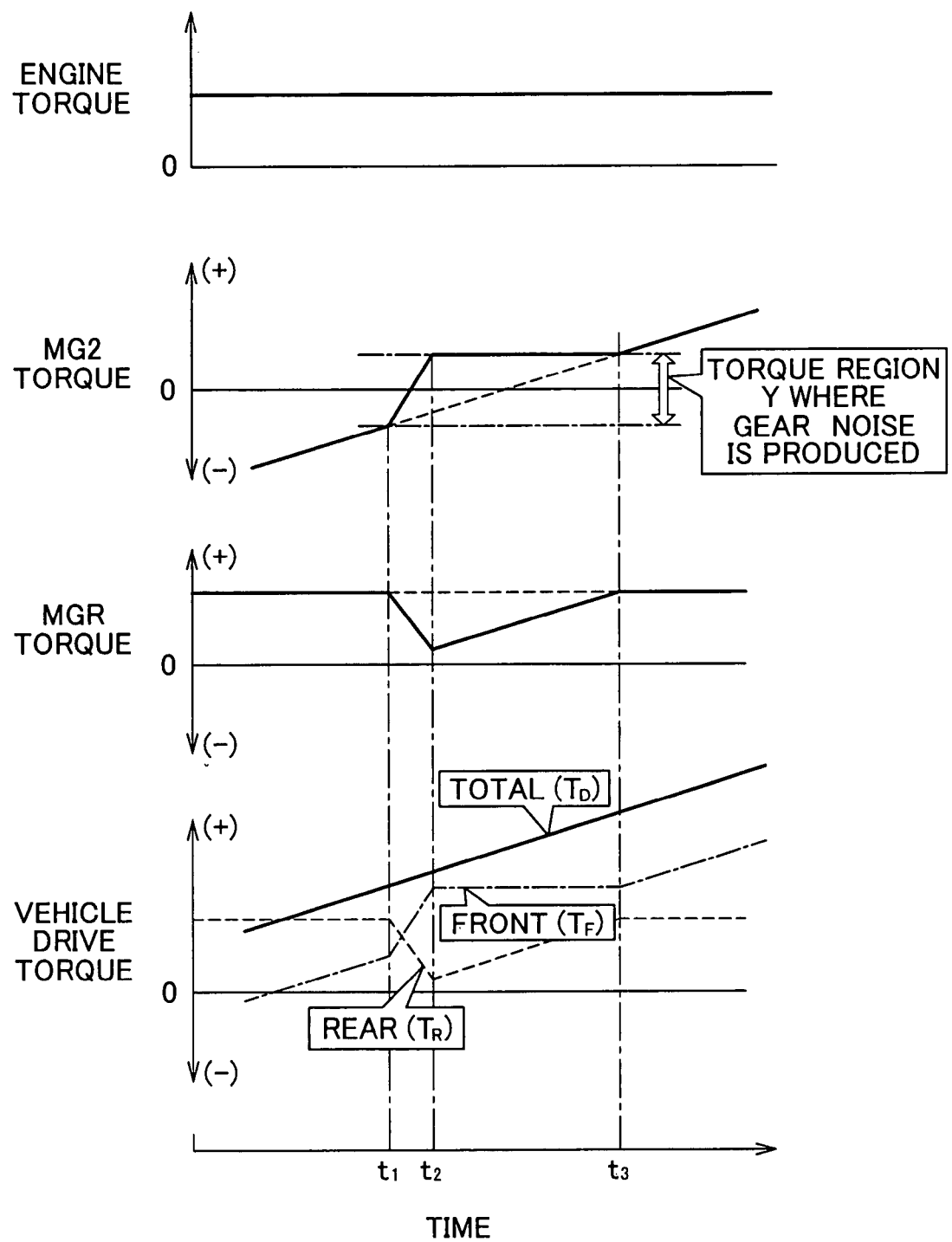
FIG. 12 is a time chart illustrating another mode for moving MG2 torque in FIG. 10 out of gear noise producing torque region.

In addition, in the second example embodiment, the rear drive torque $T_R$ is maintained at 0 or a constant negative value. Alternatively, however, as shown in FIG. 12, for example, the MG2 torque may be controlled to a constant value that exceeds the gear noise producing torque region Y and the rear drive torque $T_R$ may be controlled to respond to a change in the required drive torque $T_D$. In this case, the amounts of change in the front drive torque $T_F$ and the rear drive torque $T_R$, following the gear noise prevention control can be kept to a minimum, which reduces the effect on the vehicle behavior. Time $t_1$ to time $t_3$ in FIG. 12 corresponds to time $t_1$ to time $t_3$ in FIG. 10.

Also, in the second example embodiment, the front drive torque $T_F$ and the rear drive torque $T_R$ are directly changed so that the MG2 torque moves out of the gear noise producing torque region Y. Alternatively, however, the torque distribution ratios $K_{tf}$ and $K_{tr}$ of the front and rear wheels may be changed just as they are in the first example embodiment.

Also in the second example embodiment, the increase in the front drive torque $T_F$ is cancelled out by the decrease in the rear drive torque $T_R$. Alternatively, however, the increase in the front drive torque $T_F$ may be cancelled out by generating braking force by operating all or some of the wheel brakes 72R, 72L, 74R, and 74L via the brake control apparatus 56 shown in FIG. 2.

The hybrid vehicle of this invention may also include the second drive portion, or may have only the first drive portion. That is, when the torque of the first drive portion is increased, for example, to prevent gear noise, the increase in the drive torque may be cancelled out by applying braking torque to the wheels by the braking device.

The first drive portion includes at least the engine, the first electric motor, and the gear mechanism. However, various hybrid drive portions may also be employed. For example, the first drive portion may also include a third electric motor that is used mainly as a generator, and a gear or gearless drive mechanism and the like. The first electric motor, and the second electric motor of the second drive portion are not particularly limited as long as they at least function as electric motors. However, motor-generators that can selectively function as both an electric motor and a generator may be used for the first and second electric motors. Furthermore, the third electric motor is not particularly limited as long as it functions as a generator, and a motor-generator that can selectively function as both an electric motor and a generator may also be used.

The gear mechanism of the first drive portion may be provided with a connecting/disconnecting device such as a clutch or brake as necessary, for example, a power splitting planetary gear set for splitting power from the engine to an output member and the third electric motor, a power splitting planetary gear set for switching the transmission between forward and reverse, or a planetary gear type automatic transmission that changes gear ratios in stages. The invention is particularly effective when the engine is mechanically connected to this gear mechanism via a damper or the like. However, the invention may also be effectively applied when gear noise is produced due to torque fluctuation in the engine even if a fluid power transmitting device such as a torque converter or the like is interposed between the engine and the gear mechanism.

In the above description, the torque of the first electric motor is increased. Alternatively, however, the torque of the first electric motor may also be decreased. The torque of the electric motor may be decreased in this way not only when reducing powering torque, but also when generating braking torque by controlling the motor-generator to regenerate energy as the electric motor.

The control apparatus is not particularly limited as long as it can control the braking torque with an electric signal using, for example, a hydraulic or electric wheel brake.

The second drive portion may apply drive torque to the left and right wheels using a single drive source or include a pair of drive sources that apply drive torque separately to the left and right wheels. An electric motor, for example, may be used as the drive source or a motor-generator that can regenerate energy by regeneration control may be used.

In the description above, it is determined whether the gear noise will be produced depending on whether the torque of the first electric motor is within the predetermined gear noise producing torque region when the engine is operating in the predetermined operating state. However, when the engine torque is primarily determined according to the operating state of the engine, the determination as to whether gear noise will be produced may also be made depending on whether the total torque of the first drive portion, including the engine torque, is within the predetermined gear noise producing torque region. That is, the gear noise producing condition may be the condition that the torque of the first drive portion is within the predetermined gear noise producing torque region when the engine is operating in a predetermined operating state, and the torque changing means may also change the torque of the first electric motor so that the torque of the first drive portion moves out of the gear noise producing torque region.

When the invention is carried out while the engine is in any one of a plurality of predetermined operating states, for example, an idling state in which the throttle valve is fully closed or an optimum fuel efficiency operating state, the gear noise producing torque region may be set separately depending on the operating states.

In the description above, it is determined whether the gear noise will be produced depending on whether the torque of the first drive portion is within the predetermined gear noise producing torque region when the engine is being started or stopped. However, when the engine is being started, the engine torque is zero so the torque of the first electric motor is the torque of the first drive portion. On the other hand, when the engine is operating in a constant operating state, for example, an idling state or an optimum fuel efficiency operating state, at the time it is forced to stop the engine, the engine torque is primarily determined according to that operating state. Accordingly, the torque of the first electric motor may be the torque that is subtracted the engine torque from the first drive portion, and it may be determined whether the gear noise will be produced depending on comparing the torque of the first electric motor with the predetermined gear noise producing torque region. That is, the gear noise producing condition may be the condition that the torque of the first electric motor is within the predetermined gear noise producing torque region when a demand to start or stop the engine has been detected by the engine start/stop detecting means. The torque changing means may also change the torque of the first electric motor so that it moves out of the gear noise producing torque region.

The torque distribution controlling means continuously sets the torque distribution ratio $\alpha$ ($0<\alpha\leq1$) of the first drive portion side and the torque distribution ratio $\beta$ ($0\leq\beta<1$, $\alpha+\beta=1$) of the second drive portion side, for example, and the torque distribution changing means changes those distribution ratios $\alpha$ and $\beta$ within their set ranges. Alternatively, however, braking torque generated on the second drive portion side may be set negative and the torque distribution ratio $\beta$ may be set larger to the negative side while the torque distribution ratio $\alpha$ may be set to a value greater than 1 so that $\alpha+\beta=1$. In any case, the drive torque may be distributed according to the torque distribution ratio or the like so that the combined drive torques of the first drive portion and the second drive portion come to match the required drive torque. If the drive torque of the second drive portion side is negative, the drive torque of the first drive portion side need simply be increased by that amount.

Also, the torque distribution changing means may also make the torque distribution ratios $\alpha$ and $\beta$ constant values on the condition that the torque of the first drive portion is not in the gear noise producing torque region. For example, a may be set to 1 and $\beta$ may be set to 0 so the vehicle is driven using only the first drive portion.

In the description above, the amount of increase in the drive torque of the first drive portion, for example, is determined beforehand, and then the drive torque of the second drive portion is determined according to that amount of increase in the drive torque of the first drive portion. However, when it is assumed the drive torque of the second drive portion is reduced to a predetermined set value such as zero, for example, it is determined whether the gear noise producing condition would be no longer satisfied when it is assumed the drive torque of the first drive portion is increased according to the amount of the decrease in the drive torque of the second drive portion. Then, if it is determined that the gear noise producing condition would be no longer satisfied, the torque changing means may increase the drive torque of the first drive portion by the amount of that increase while the drive torque change canceling means sets the drive torque of the second drive portion to the set value. That is, the drive torque change canceling means only needs to cancel out the increase in the drive torque of the first drive portion according to the torque changing means.

The vehicle behavior determining means, for example, determines when the vehicle behavior has actually become or will become unstable by a difference in the wheel speeds of the plurality of wheels, or determines that the vehicle behavior will become unstable if there is a change in the torque of the first drive portion or the like from, for example, the running environment such as the friction coefficient μ or the gradient of the road and the operating conditions such as the steering angle and vehicle speed.

When the vehicle behavior determining means determines that the vehicle behavior becomes or will become unstable, the torque change restricting means, which restricts a change in the torque of the first electric motor performed by the torque changing means, prohibits or cancels the change in the torque of the first electric motor performed by the torque changing means, for example. However, various modes are possible. For example, the torque change restricting means may also restrict the amount of change in the torque to be equal to or less than a predetermined value or a predetermined ratio, or may change the torque gradually at a slower rate than normal.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control apparatus for a hybrid vehicle, comprising:
   a required torque calculating portion that calculates a required drive torque required of the vehicle;
   a running mode switching portion that switches between running modes according to at least the calculated required drive torque, from among i) a motor running mode, in which wheels are driven by power from an electric motor; and ii) a hybrid running mode, in which the wheels are driven by operating both an engine and an electric motor;
   a torque distribution control portion that sets torque distribution between front and rear wheels according to at least the switched running mode;
   a gear noise preventing portion that prevents gear noise in a gear mechanism due to torque fluctuation in the engine by changing the set torque distribution between the front and rear wheels when a predetermined gear noise producing condition is satisfied; and
   a drive torque control portion that calculates drive torques of the front and rear wheels based on at least the calculated required drive torque and the changed torque distribution between the front and rear wheels, and controls the drive torques of the engine and the electric motor.

2. The control apparatus for a hybrid vehicle according to claim 1, wherein
   the gear noise preventing portion includes i) a gear noise determining portion that determines whether torque of a first drive portion satisfies the predetermined gear noise producing condition, wherein the first drive portion includes the engine, a first electric motor, and the gear mechanism and the first drive portion applies drive torque to one of the front or rear wheels of the vehicle, and ii) a torque distribution changing portion that changes the set torque distribution between the front and rear wheels when it is determined that the torque of the first drive portion satisfies the gear noise producing condition so that the torque of the first drive portion no longer satisfies the gear noise producing condition.

3. The control apparatus for a hybrid vehicle according to claim 2, wherein
the torque distribution changing portion includes i) a drive torque changing portion that changes the drive torque of the first electric motor such that the torque of the first drive portion no longer satisfies the gear noise producing condition, and ii) a drive torque change canceling portion that cancels out a change in the drive torque of the vehicle by controlling drive torque from a second drive portion according to the change in the drive torque of the first electric motor, wherein the second drive portion applies drive torque to the other of the front and rear wheels of the vehicle.

4. The control apparatus for a hybrid vehicle according to claim 3, wherein
the drive torque changing portion increases the drive torque of the first electric motor such that the torque of the first drive portion no longer satisfies the gear noise producing condition, and
the drive torque change canceling portion cancels out the change in the drive torque of the vehicle by reducing the drive torque from the second drive portion.

5. The control apparatus for a hybrid vehicle according to claim 3, wherein
the drive torque change canceling portion cancels out the change in the drive torque of the vehicle by applying braking torque via a braking device provided in the vehicle.

6. The control apparatus for a hybrid vehicle according to claim 4, wherein
the second drive portion includes a second electric motor which regenerates energy, and
the drive torque change canceling portion cancels out the change in the drive torque of the vehicle by controlling the second electric motor to regenerate energy and generate braking torque.

7. The control apparatus for a hybrid vehicle according to claim 3, wherein
when it is determined that the torque of the first electric motor is within a predetermined gear noise producing torque region by the gear noise determining portion while the engine operates in a predetermined operating state, the drive torque changing portion changes the drive torque of the first electric motor such that the torque of the first electric motor is no longer within the predetermined gear noise producing torque region.

8. The control apparatus for a hybrid vehicle according to claim 3, wherein
the gear noise preventing portion further includes an engine start/stop detecting portion that detects at least one of a demand to start the engine and a demand to stop the engine following a switch in the running mode, and
when it is determined that the torque of the first drive portion is within a predetermined gear noise producing torque region by the gear noise determining portion at the time the engine start/stop detecting portion detects one of the demand to start the engine or the demand to stop the engine, the drive torque changing portion changes the drive torque of the first electric motor such that the first drive portion is no longer within the predetermined gear noise producing torque region.

9. The control apparatus for a hybrid vehicle according to claim 8, wherein the gear noise producing torque region is set based on one of a torque fluctuation range when the engine is stopped or a torque fluctuation range when the engine is started.

10. The control apparatus for a hybrid vehicle according to claim 4, wherein
the drive torque change canceling portion cancels out the change in the drive torque of the vehicle by maintaining the drive torque from the second drive portion at a predetermined value according to the increased amount in the drive torque of the first electric motor.

11. The control apparatus for a hybrid vehicle according to claim 3, wherein
the gear noise preventing portion further includes i) a vehicle behavior determining portion that determines whether vehicle behavior will become unstable when the drive torque of the electric motor is changed such that the torque of the first drive portion no longer satisfies the gear noise producing condition, and ii) a torque change restricting portion that restricts the change in the torque of the first electric motor when it is determined that the vehicle behavior will become unstable.

12. A control method for a hybrid vehicle, comprising:
calculating a required drive torque that is required of the vehicle;
switching between running modes according to at least the calculated required drive torque, from among i) a motor running mode, in which wheels are driven by power from an electric motor; and ii) a hybrid running mode, in which the wheels are driven by operating both an engine and an electric motor;
setting torque distribution between front and rear wheels according to at least the switched running mode;
changing the set torque distribution between the front and rear wheels when a predetermined gear noise producing condition is satisfied; and
calculating drive torques of the front and rear wheels based on at least the calculated required drive torque and the changed torque distribution between the front and rear wheels, and controlling the drive torques of the engine and the electric motor.

13. The control method for a hybrid vehicle according to claim 12, wherein
changing the set torque distribution between the front and rear wheels includes:
determining whether torque of a first drive portion satisfies the predetermined gear noise producing condition, wherein the first drive portion includes the engine, a first electric motor, and the gear mechanism and the first drive portion applies drive torque to one of the front or rear wheels of the vehicle; and
changing the set torque distribution between the front and rear wheels when it is determined that the torque of the first drive portion satisfies the gear noise producing condition such that the torque of the first drive portion no longer satisfies the gear noise producing condition.

14. The control method for a hybrid vehicle according to claim 13, wherein
changing the set torque distribution between the front and rear wheels further includes:
changing the drive torque of the first electric motor such that the torque of the first drive portion no longer satisfies the gear noise producing condition; and
controlling drive torque of a second drive portion that applies drive torque to the other of the front and rear wheels of the vehicle, according to the change in the drive torque of the first electric motor to cancel out a change in the drive torque of the vehicle.

15. A control apparatus for a hybrid vehicle, comprising:

required torque calculating means for calculating a required drive torque required of the vehicle;

running mode switching means for switching between running modes according to at least the calculated required drive torque, from among i) a motor running mode, in which wheels are driven by power from an electric motor; and ii) a hybrid running mode, in which the wheels are driven by operating both an engine and an electric motor;

torque distribution control means for setting torque distribution between front and rear wheels according to at least the switched running mode;

gear noise preventing means for preventing gear noise in a gear mechanism due to torque fluctuation in the engine by changing the set torque distribution between the front and rear wheels when a predetermined gear noise producing condition is satisfied; and drive torque control means for calculating drive torques of the front and rear wheels based on at least the calculated required drive torque and the changed torque distribution between the front and rear wheels, and controlling the drive torques of the engine and the electric motor.

* * * * *